US012289758B2

(12) United States Patent
Tooher et al.

(10) Patent No.: US 12,289,758 B2
(45) Date of Patent: *Apr. 29, 2025

(54) METHODS FOR CHANNEL ACCESS MANAGEMENT

(71) Applicant: INTERDIGITAL PATENT HOLDINGS, INC., Wilmington, DE (US)

(72) Inventors: J. Patrick Tooher, Montreal (CA); Faris Alfarhan, Montreal (CA); Paul Marinier, Brossard (CA); Aata El Hamss, Laval (CA); Ghyslain Pelletier, Montreal (CA); Dylan James Watts, Montreal (CA)

(73) Assignee: INTERDIGITAL PATENT HOLDINGS, INC., Wilmington, DE (US)

(*) Notice: Subject to any disclaimer, the term of this patent is extended or adjusted under 35 U.S.C. 154(b) by 381 days.

This patent is subject to a terminal disclaimer.

(21) Appl. No.: 17/861,770

(22) Filed: Jul. 11, 2022

(65) Prior Publication Data

US 2022/0346139 A1 Oct. 27, 2022

Related U.S. Application Data

(63) Continuation of application No. 17/044,904, filed as application No. PCT/US2019/025644 on Apr. 3, 2019, now Pat. No. 11,388,747.
(Continued)

(51) Int. Cl.
*H04W 74/00* (2009.01)
*H04W 72/044* (2023.01)
(Continued)

(52) U.S. Cl.
CPC ..... *H04W 74/002* (2013.01); *H04W 72/0446* (2013.01); *H04W 72/0453* (2013.01);
(Continued)

(58) Field of Classification Search
CPC .......... H04W 74/002; H04W 72/0446; H04W 72/0453; H04W 72/046; H04W 74/006; H04W 74/0808
See application file for complete search history.

(56) References Cited

U.S. PATENT DOCUMENTS 9,713,035 B2   7/2017   Bhushan et al.
9,763,221 B2   9/2017   Patil et al.
(Continued)

FOREIGN PATENT DOCUMENTS

CA   3 029 227   7/2019
EP   3 214 889   9/2017

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
(Continued)

*Primary Examiner* — Jael M Ulysse
(74) *Attorney, Agent, or Firm* — Volpe Koenig

(57) ABSTRACT

A method performed by a WTRU may comprise receiving a plurality of LBT configurations associated with one or more of a beam, a BWP, a LCH, a set of LBT parameters, a transmission type or an LBT subband. The method may further comprise receiving an indication to transmit using a first LBT configuration of the plurality of LBT configurations. An attempt to acquire a channel may then be made using the first LBT configuration. The indication to transmit
(Continued)

may additionally indicate a second LBT configuration of the plurality of LBT configurations. Data may be transmitted on the channel when the attempt to acquire the channel is successful. An attempt to acquire the channel using the second LBT configuration of the plurality of LBT configurations may be made when the attempt to acquire the channel using the first LBT configuration fails.

14 Claims, 9 Drawing Sheets

Related U.S. Application Data

(60) Provisional application No. 62/715,646, filed on Aug. 7, 2018, provisional application No. 62/687,008, filed on Jun. 19, 2018, provisional application No. 62/652,116, filed on Apr. 3, 2018.

(51) Int. Cl.
*H04W 72/0446* (2023.01)
*H04W 72/0453* (2023.01)
*H04W 74/0808* (2024.01)

(52) U.S. Cl.
CPC ....... *H04W 72/046* (2013.01); *H04W 74/006* (2013.01); *H04W 74/0808* (2013.01)

(56) References Cited

U.S. PATENT DOCUMENTS

| | | | |
|---|---|---|---|
| 10,009,925 B2 | 6/2018 | Vajapeyam et al. | |
| 10,660,127 B2 | 5/2020 | Yang et al. | |
| 10,721,766 B2 | 7/2020 | Kim et al. | |
| 10,779,172 B2* | 9/2020 | Moon | H04W 72/0446 |
| 10,945,172 B2 | 3/2021 | Jeon et al. | |
| 11,388,747 B2* | 7/2022 | Tooher | H04W 74/006 |
| 2017/0027002 A1* | 1/2017 | Yerramalli | H04W 74/0816 |
| 2017/0223677 A1* | 8/2017 | Dinan | H04L 27/0006 |
| 2017/0231005 A1* | 8/2017 | Babaei | H04L 5/0053 |
| 2017/0318607 A1* | 11/2017 | Tiirola | H04W 4/10 |
| 2017/0332410 A1* | 11/2017 | Babaei | H04W 74/0833 |
| 2017/0332440 A1* | 11/2017 | Xu | H04B 1/713 |
| 2018/0007575 A1* | 1/2018 | Singhal | H04W 76/15 |
| 2018/0124687 A1* | 5/2018 | Park | H04L 5/1469 |
| 2018/0124789 A1* | 5/2018 | Yerramalli | H04L 5/0048 |
| 2018/0145919 A1* | 5/2018 | Kalikot Veetil | H04L 5/001 |
| 2018/0176961 A1* | 6/2018 | Babaei | H04W 74/0833 |
| 2018/0184362 A1* | 6/2018 | Babaei | H04W 48/12 |
| 2018/0235005 A1* | 8/2018 | Ansari | H04L 27/0006 |
| 2018/0242163 A1* | 8/2018 | Patel | H04W 48/10 |
| 2018/0324604 A1* | 11/2018 | Yang | H04W 24/02 |
| 2019/0044689 A1 | 2/2019 | Yiu et al. | |
| 2019/0053273 A1* | 2/2019 | Kim | H04W 28/0205 |
| 2019/0082436 A1* | 3/2019 | Huang | H04W 28/18 |
| 2019/0110318 A1* | 4/2019 | Zhang | H04B 17/309 |
| 2019/0190668 A1* | 6/2019 | Lei | H04L 5/001 |
| 2019/0191457 A1* | 6/2019 | Si | H04L 5/0053 |
| 2019/0200248 A1* | 6/2019 | Basu Mallick | H04W 24/04 |
| 2019/0215048 A1 | 7/2019 | Cirik et al. | |
| 2019/0253200 A1* | 8/2019 | Salem | H04W 74/0808 |
| 2019/0261244 A1* | 8/2019 | Jung | H04L 5/0048 |
| 2019/0289513 A1 | 9/2019 | Jeon et al. | |
| 2019/0306923 A1* | 10/2019 | Xiong | H04L 27/261 |
| 2019/0357270 A1* | 11/2019 | Kurth | H04W 72/23 |
| 2019/0364469 A1* | 11/2019 | Siomina | H04W 36/0085 |
| 2019/0373509 A1* | 12/2019 | Yang | H04L 27/0006 |
| 2020/0037359 A1* | 1/2020 | Wang | H04W 72/23 |
| 2020/0229147 A1* | 7/2020 | Jiang | H04W 72/0453 |
| 2020/0236708 A1* | 7/2020 | Li | H04W 72/23 |
| 2020/0236729 A1* | 7/2020 | Ahn | H04W 16/14 |
| 2020/0281022 A1* | 9/2020 | Pelletier | H04W 52/367 |
| 2020/0314809 A1* | 10/2020 | Zhang | H04W 72/04 |
| 2020/0374960 A1* | 11/2020 | Deenoo | H04W 76/19 |
| 2021/0007101 A1* | 1/2021 | Tooher | H04W 72/0453 |
| 2021/0045144 A1* | 2/2021 | Kim | H04W 72/30 |
| 2021/0211908 A1* | 7/2021 | Jiang | H04L 5/0051 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems. Local and metropolitan area networks—Specific requirements; Part 11: Wireless LAN Medium Access Control (MAC) and Physical Layer (PHY) Specifications; Amendment 2: Sub 1 GHz License Exempt Operation, IEEE P802.11ah-2016 (Dec. 7, 2016).
Intel Corporation, "Transmission of Uplink Control Information on an LAA SCell," 3GPP TSG RAN WG1 Meeting #84bis, R1-162357, Busan, Korea (Apr. 11-15, 2016 ).
Interdigital Inc., "Discussion on LBT in Unlicensed Higher Frequency Bands," 3GPP TSG RAN WG1 Meeting #92, R1-1802651 Athens, Greece (Feb. 26-Mar. 2, 2018).
Interdigital Inc., "On LBT for Beam-Based Transmission for NR-U," 3GPP TSG RAN WG1 Meeting #92bis, R1-1804885, Sanya, China (Apr. 16-20, 2018).
Interdigital Inc., "RLM and RLF for NR-U," 3GPP TSG-RAN WG2 Meeting #105, R2-1901715, R2-1901715 (Feb. 25-Mar. 1, 2019).
Interdigital Inc., "RLM/RLF for NR-U," 3GPP RAN WG2 Meeting #103bis, R2-1814011, R2-1814011 (Oct. 8-12, 2018).
Interdigital Inc., "RLM/RLF for NR-U," 3GPP TSG-RAN WG2 Meeting #103, R2-1811454, Gothenburg, Sweden (Aug. 20-24, 2018).
Qualcomm Incorporated, "Procedures Related to NOMA," 3GPP TSG RAN WG1 Meeting #92bis, R1-1804825, Sanya, China (Apr. 16-20, 2018).
Qualcomm Incorporated, "Revised SID on NR-based Access to Unlicensed Spectrum," 3GPP TSG RAN Meeting #77, RP-172021, Sapporo, Japan (Sep. 11-14, 2017).
Third Generation Partnership Project, "Technical Specification Group Radio Access Network; Evolved Universal Terrestrial Radio Access (E-UTRA); Physical layer procedures (Release 15)," 3GPP TS 36.213 V15.0.0 (Dec. 2017).
Third Generation Partnership Project, "Technical Specification Group Radio Access Network; Evolved Universal Terrestrial Radio Access (E-UTRA); Physical layer procedures (Release 15)," 3GPP TS 36.213 V15.1.0 (Mar. 2018).
Third Generation Partnership Project, "Technical Specification Group Radio Access Network; Evolved Universal Terrestrial Radio Access (E-UTRA); Physical layer procedures (Release 15)," 3GPP TS 36.213 V15.5.0 (Mar. 2019).
Third Generation Partnership Project, "Technical Specification Group Radio Access Network; Study on Licensed-Assisted Access to Unlicensed Spectrum; (Release 13)," 3GPP TR 36.889 V13.0.0 (Jun. 2015).

(56) References Cited

OTHER PUBLICATIONS

Third Generation Partnership Project, "Technical Specification Group Radio Access Network; NR; Medium Access Control (MAC) protocol specification (Release 15)," 3GPP TS 38.321 V15.1.0 (Mar. 2018).
Third Generation Partnership Project, "Technical Specification Group Radio Access Network; NR; Medium Access Control (MAC) protocol specification (Release 15)," 3GPP TS 38.321 V15.4.0 (Dec. 2018).
Third Generation Partnership Project, "Technical Specification Group Radio Access Network; NR; Radio Resource Control (RRC) protocol specification (Release 15)," 3GPP TS 38.331 V15.1.0 (Mar. 2018).
Third Generation Partnership Project, "Technical Specification Group Radio Access Network NR Radio Resource Control (RRC) protocol specification (Release 15)," 3GPP TS 38.331 V15.4.0 (Dec. 2018).
Vivo, "Potential solutions and techniques for NR unlicensed spectrum," 3GPP TSG RAN WG1 Meeting #92 R1-1801557, Athens, Greece (Feb. 26-Mar. 2, 2018).
Third Generation Partnership Project, "Technical Specification Group Radio Access Network NR; NR and NG-RAN Overall Description; Stage 2 (Release 15)," 3GPP TS 38.300 V15.1.0 (Mar. 2018).
Third Generation Partnership Project, "Technical Specification Group Radio Access Network; NR; NR and NG-RAN Overall Description; Stage 2 (Release 15)," 3GPP TS 38.300 V15.4.0 (Dec. 2018).

* cited by examiner

METHODS FOR CHANNEL ACCESS MANAGEMENT

CROSS REFERENCE TO RELATED APPLICATIONS

This application is a continuation of U.S. patent application Ser. No. 17/044,904, filed on Oct. 2, 2020, which is the U.S. National Stage, under 35 U.S.C. § 371, of International Application No. PCT/US2019/025644, filed Apr. 3, 2019, which claims the benefit of U.S. Provisional Application No. 62/652,116, filed on Apr. 3, 2018, U.S. Provisional Application No. 62/687,008 filed on Jun. 19, 2018 and U.S. Provisional Application No. 62/715,646 filed on Aug. 7, 2018, the contents of which are hereby incorporated by reference herein.

SUMMARY

A method performed by a wireless transmit/receive unit (WTRU) may comprise receiving a plurality of listen before talk (LBT) configurations associated with one or more of a beam, a bandwidth part (BWP), a logical channel (LCH), a set of LBT parameters, a transmission type or an LBT subband. The method may further comprise receiving an indication to transmit using a first LBT configuration of the plurality of LBT configurations. An attempt to acquire a channel may then be made using the first LBT configuration. The indication to transmit may additionally indicate a second LBT configuration of the plurality of LBT configurations. Data may be transmitted on the channel when the attempt to acquire the channel is successful. An attempt to acquire the channel using the second LBT configuration of the plurality of LBT configurations may be made when the attempt to acquire the channel using the first LBT configuration fails.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
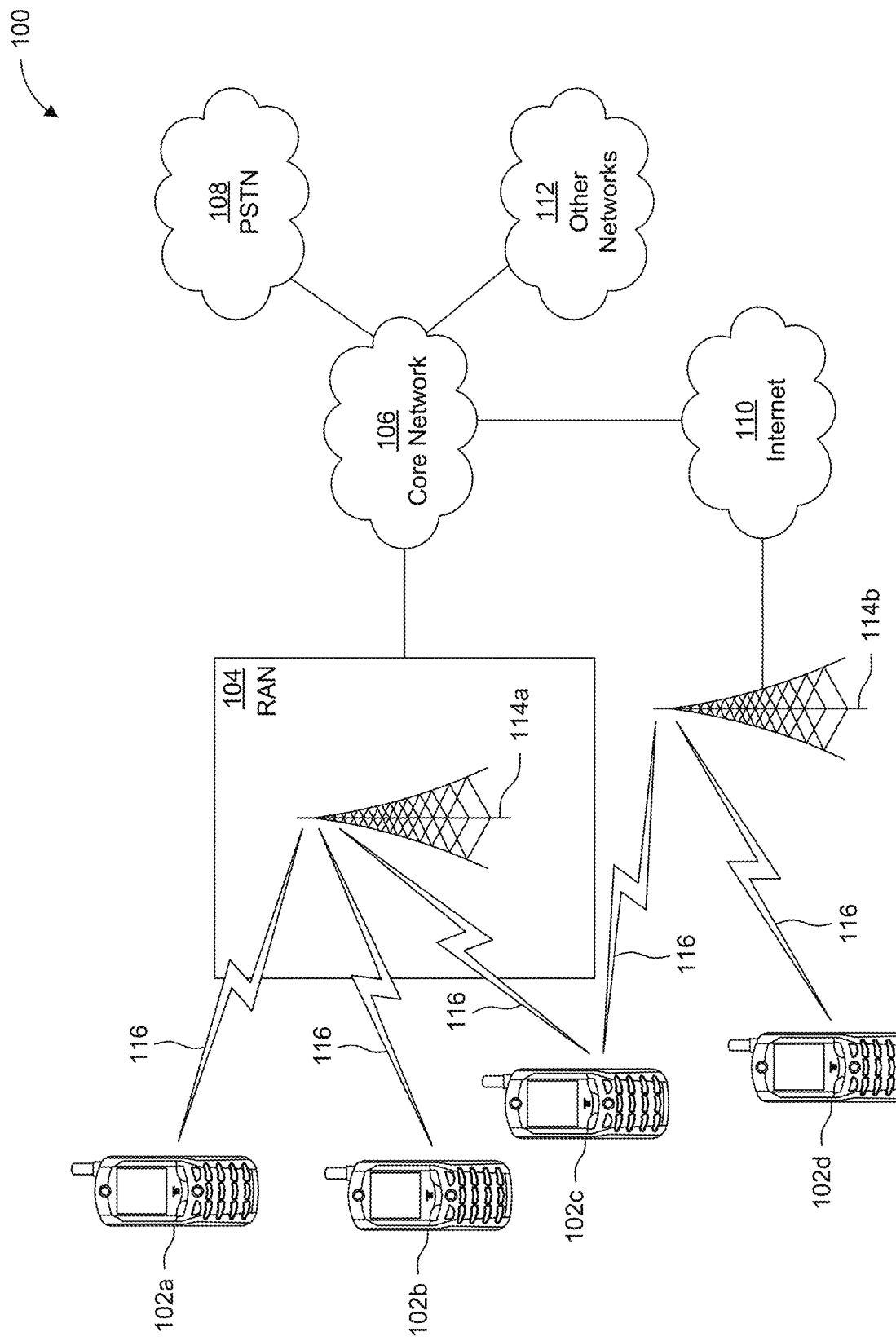
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
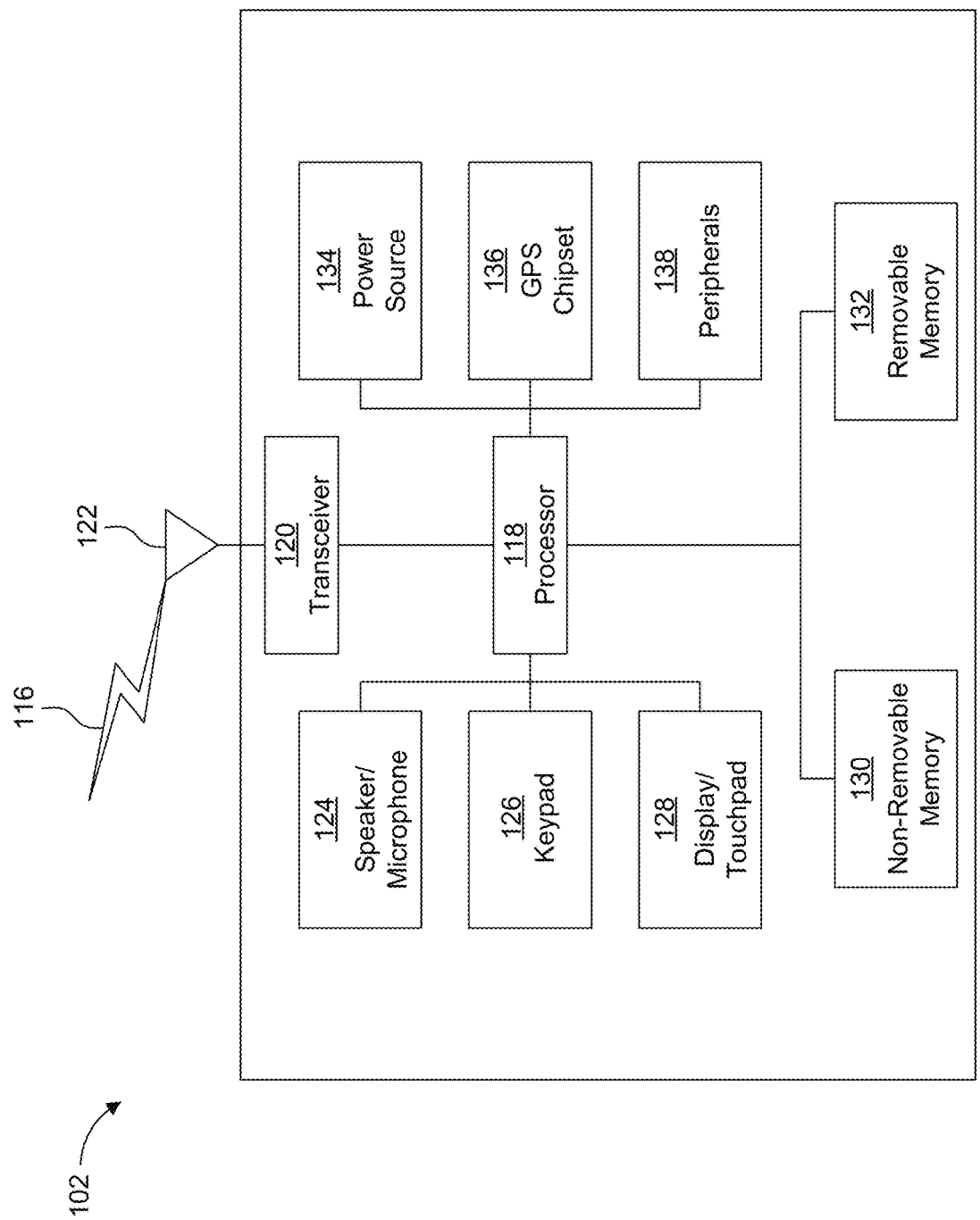
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
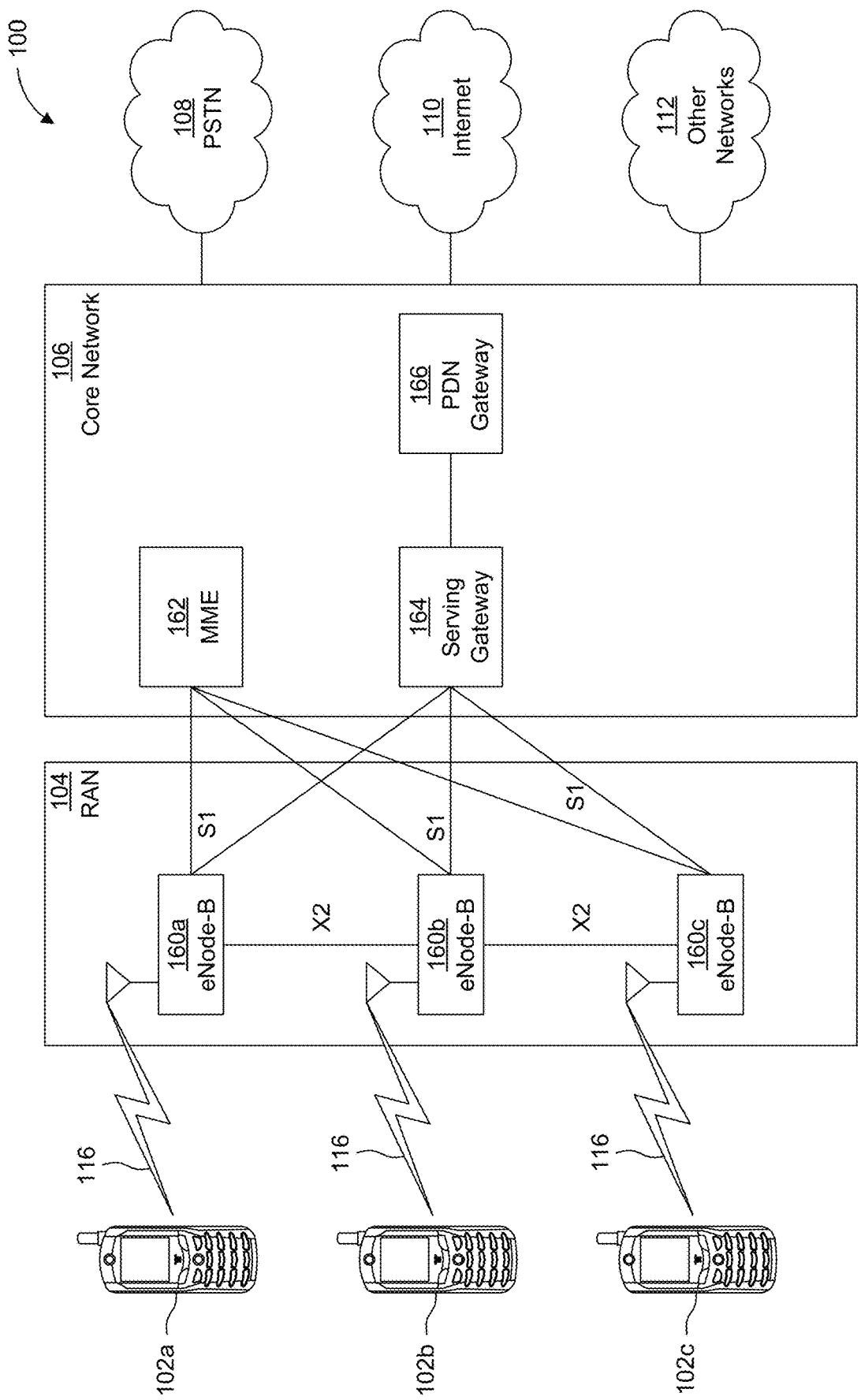
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
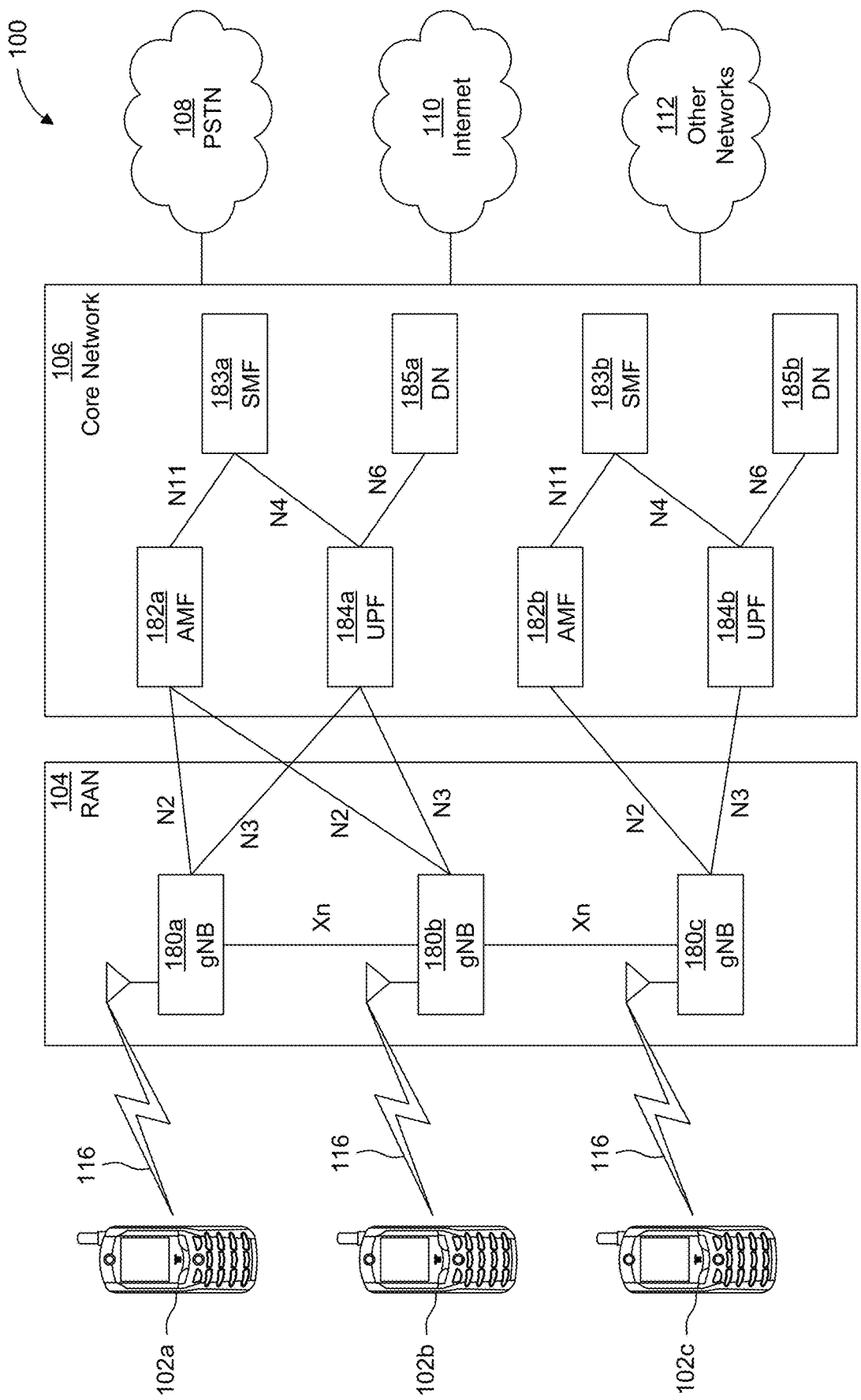
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Operation in an unlicensed frequency band may be subject to some limits on the transmit power control (TPC), the RF output power and power density given by the mean EIRP and the mean EIRP density at the highest power level. It may further be subject to requirements on the transmitter out of band emissions. Such may be specific to bands and/or geographical locations.

Operation may be further subject to requirements on the Nominal Channel Bandwidth (NCB) and the Occupied Channel Bandwidth (OCB) are defined for unlicensed spectrum in the 5 GHz region. The Nominal Channel Bandwidth, i.e., the widest band of frequencies inclusive of guard bands assigned to a single channel, shall be at least 5 MHz at all times. The Occupied Channel Bandwidth, i.e., the bandwidth containing 99% of the power of the signal, shall be between 80% and 100% of the declared Nominal Channel Bandwidth. During an established communication, a device is allowed to operate temporarily in a mode where its Occupied Channel Bandwidth may be reduced to as low as 40% of its Nominal Channel Bandwidth with a minimum of 4 MHz.

Channel access in an unlicensed frequency band may use a Listen-Before-Talk (LBT) mechanism. LBT is typically mandated independently of whether the channel is occupied or not.

For frame-based systems, LBT may be characterized by a Clear Channel Assessment (CCA) time (for example, ~20 µs), a Channel Occupancy time (for example, minimum 1 ms, maximum 10 ms), an idle period (for example, minimum 5% of channel occupancy time), a fixed frame period (for example, equal to the channel occupancy time+idle period), a short control signaling transmission time (for example, maximum duty cycle of 5% within an observation period of 50 ms), and a CAA energy detection threshold.

For load-based systems (for example, transmit/receive structure may not be fixed in time), LBT may be characterized by a number N corresponding to the number of clear idle slots in extended CCA instead of the fixed frame period. N may be selected randomly within a range.

Deployment scenarios may include different standalone NR-based operation, different variants of dual connectivity operation for example, EN-DC with at least one carrier operating according to the LTE radio access technology (RAT) or NR DC with at least two set of one or more carriers operating according to the NR RAT, and/or different variants of carrier aggregation (CA) for example, possibly also including different combinations of zero or more carriers of each of LTE and NR RATs.

A licensed assisted access (LAA) system may employ parameters and or procedures in order for a WTRU to access a channel. As used herein, a listen-before-talk (LBT) procedure may be a mechanism by which an equipment, for example, a UE or WTRU, applies a clear channel assessment (CCA) check before using the channel. The CCA may utilize at least energy detection to determine the presence or absence of other signals on a channel in order to determine if a channel is occupied or clear, respectively. European and Japanese regulations mandate the usage of LBT in the unlicensed bands. Apart from regulatory requirements, carrier sensing via LBT is one way for fair sharing of the unlicensed spectrum and hence it is considered to be a vital feature for fair and friendly operation in the unlicensed spectrum in a single global solution framework.

Discontinuous transmission on a carrier with limited maximum transmission duration. In unlicensed spectrum, channel availability cannot always be guaranteed. In addition, certain regions such as Europe and Japan prohibit continuous transmission and impose limits on the maximum duration of a transmission burst in the unlicensed spectrum. Hence, discontinuous transmission with limited maximum transmission duration is a required functionality for LAA.

As there is a large available bandwidth of unlicensed spectrum, carrier selection is disclosed for LAA nodes to select the carriers with low interference and with that achieve good coexistence with other unlicensed spectrum deployments.

Transmit Power Control (TPC) is a regulatory requirement in some regions by which the transmitting device should be able to reduce the transmit power in a proportion of 3 dB or 6 dB compared to the maximum nominal transmit power. This requirement does not need new specifications.

Radio resource management (RRM) measurements including cell identification enable mobility between SCells and robust operation in the unlicensed band.

A Channel-State Information (CSI) measurement, including channel and interference measurement. A WTRU operating in an unlicensed carrier should also support the necessary frequency/time estimation and synchronization to enable RRM measurements and for successful reception of information on the unlicensed band.

In NR, a WTRU may operate using bandwidth parts (BWPs) in a carrier. First, a WTRU may access the cell using an initial BWP. It may then be configured with a set of BWPs to continue operation. At any given moment, a WTRU may have 1 active BWP. Each BWP is configured with a set of control resource sets (CORESETs) within which a WTRU may blind decode PDCCH candidates for scheduling, among other things.

Furthermore, NR supports variable transmission duration and feedback timing. With variable transmission duration, a physical downlink shared channel (PDSCH) or physical uplink shared channel (PUSCH) transmission may occupy a contiguous subset of symbols of a slot. With variable feedback timing, the downlink control indicator (DCI) for a DL assignment may include an indication for the timing of the feedback for the WTRU, for example, by pointing to a specific physical uplink control channel (PUCCH) resource.

NR supports two types of PUCCH resources, a short PUCCH and a long PUCCH. The former may be transmitted using 1 or 2 OFDM symbols, while the latter may use up to 14 OFDM symbols. Each PUCCH type has multiple formats which may depend on the type and/or size of corresponding payload.

Beam failure may be detected and recovered from. In a beamformed NR system, the WTRU may be configured to maintain one or multiple beam pairs. The WTRU monitors one or more certain periodic channel state information reference signal (CSI-RS) on a serving DL beam to assess its quality and computes a corresponding quality metric. If the beam's quality in a given RS period is below a configured threshold, the WTRU's physical (PHY) layer entity reports a beam failure instance (BFI) to the MAC sub-layer.

In order to re-establish lost beam pair(s) in a faster manner as compared to the Radio Link Monitoring (RLM)/radio link failure (RLF) (RLM/RLF) procedure, the MAC layer of the WTRU may employ a beam failure recovery (BFR) procedure in which a beam failure recovery request is reported to the network upon detecting a beam failure. BFR may be configured for beam maintenance on a configured PCell and/or SCell.

The MAC entity may maintain a beam failure instance counter (BFI_counter) for the purpose of beam failure detection. The MAC entity counts the number of beam failure instance indications received from the PHY entity. If the BFI counter exceeds a certain maximum number of BFIs, a BFR request is triggered to notify the serving gNB that a beam failure has been detected.

The MAC entity may reset a BFI counter only after a beam failure detection (BFD) timer (BFD_timer) has expired. This may help provide some hysteresis in the detection function. In such cases, the WTRU resets the BFD_timer each time a BFI is indicated by the PHY layer. For example, the MAC entity may only reset the BFI_counter after observing no BFI indications from PHY for three consecutive CSI-RS periods if the BFD timer is configured to 3 CSI-RS periods. In another example, the BFI counter may be reset after observing no BFI indications after two, four or five consecutive CSI-RS periods.

To report a BFR request, the WTRU may initiate a random access procedure with certain parameter values, for example PreambleTransMax, power ramping step and a target received preamble power. A random access procedure may be used for beam re-establishment, as the WTRU may select an appropriate physical random access channel (PRACH) preamble and/or PRACH resource dependent on the best measured downlink beam or DL synchronization signal block (SSB). The WTRU may employ a method to reestablish a beam pair when it determines an association between DL beams and UL preambles and/or PRACH occasions, whereby the downlink beam selected by the WTRU is tested by receiving a random access response (RAR) on it. Such reestablishment RA procedure may be made faster if the gNB configures a certain set of contention-free PRACH preambles/resources, which may be prioritized for selection by the WTRU upon initiating the RA procedure.

Logical Channel Prioritization (LCP) is a mechanism used to associate data available for transmission with resources available for uplink transmissions. Multiplexing of data with different QoS requirements within the same transport block may be supported, for example, as long as such multiplexing neither introduces any negative impact to the service with the most stringent QoS requirement nor introduces an unnecessary waste of system resources.

When assembling a MAC PDU and filling a TB for an UL transmission, the WTRU typically serves data from one or more logical channels (LCHs) using the following principles: the WTRU typically performs LCP with up to two rounds: Firstly, in round 1 (or equivalently, steps 1, 2), data from logical channels is taken up to a Prioritized Bit Rate (PBR) in decreasing priority order. Data may exceed the available amount of data for the LCH for transmission in a given TTI, i.e. the "bucket," typically to avoid unnecessary RLC segmentation.

Secondly, in round 2 (or equivalently, step 3), data from logical channels may be taken in strict decreasing order to fill the remaining resources. RRC may additionally control the LCP procedure by configuring mapping restrictions for each logical channel by controlling the following parameters: allowedSCS-List may set the allowed subcarrier spacing(s) for transmission or retransmission; maxPUSCH-Duration may set the maximum PUSCH duration allowed for transmission; configuredGrantType1Allowed may set whether a Configured Grant Type 1 may be used for transmission; allowedServingCells may set the allowed cell(s) for transmission. In one embodiment, additional restrictions may include one or more applicable MCS table(s), MCS values, RNTI(s) or search space(s) of the PDCCH for a DCI that schedules the transmission.

Embodiments disclosed herein may apply to NR-based operation in unlicensed spectrum, including initial access, scheduling, HARQ and mobility, along with coexistence methods including LTE-LAA and other incumbent RATs. For example, an NR-based LAA cell may be connected with an LTE or NR anchor cell as well as an NR-based cell which may be operating in a standalone mode in unlicensed spectrum.

Unlicensed spectrum used for New Radio Unlicensed (NR-U) may have some regulatory requirements to ensure fair use of the spectrum among multiple RATs. Such requirements may lead to non-continuous use of a channel in time or frequency so as to allow for transmissions of other STAs or devices. Furthermore, such requirements may impose restrictions on how to determine that a channel may be used without introducing undue interference.

WTRUs in unlicensed spectrum may operate in a flexible manner with multiple BWPs and beams. Therefore, an unlicensed channel in NR may be determined from parameters such as BWP and beam. As such, the WTRU may use different channel access mechanisms based on the parameters of the channel. Thus, it may be useful to support methods that provide an efficient way to enable WTRUs to access channels with different parameters, while maintaining some fairness. In addition, it may also be useful to support methods that increase reliability, minimize latency or achieve gains in both aspects, for example, supporting offloadedURLLC data or traffic to an unlicensed spectrum. Minimizing latency and increasing reliability may also be achieved in a stand-alone NR-U deployment.

Furthermore, some functions in NR such as beam maintenance are based on periodic transmissions. Fair channel use may not allow periodic transmissions; therefore methods to enable beam maintenance in unlicensed channels may be employed while still ensuring fairness in channel access. The impact of LBT and similar fairness principles for accessing the channel for beam maintenance may also impact the ability to serve the requirements of some transmissions with respect to reliability and latency, for example, with respect to the high reliability and latency requirements of URLLC traffic.

Figure 2:
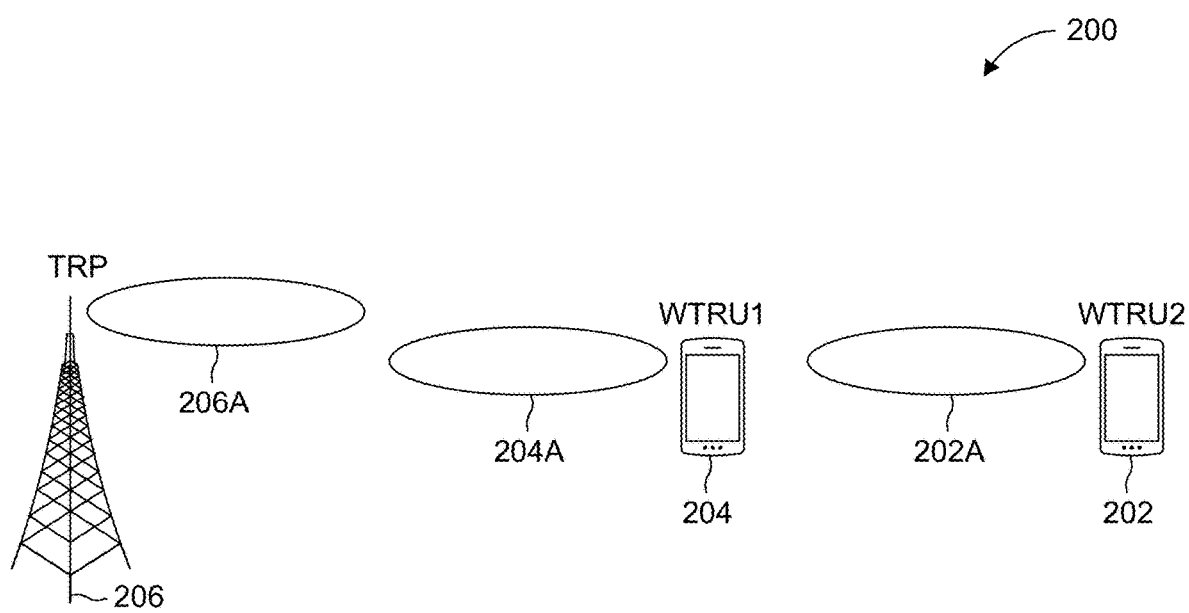
FIG. 2 is a diagram illustrating an example of a listen before talk (LBT) failure due to beamforming.

FIG. 2 is an example diagram 200 illustrating an LBT failure due to narrow beam beamforming using existing mechanisms. When WTRUs are operating with narrow beams, the basic LBT mechanism may become less effective, or may fail its intended purpose. As shown in FIG. 2, two WTRUs, WTRU1 202 and WTRU2 204, may be attempting to communicate with a same transmission/reception point (TRP) 206. WTRU2 202 may be transmitting to the TRP 206 using a given TX beam 202A. TRP 206 may have a RX beam 206A oriented toward beam 202A. Assuming that WTRU1 204 is using an existing LBT mechanism, WTRU1 204 may not detect TX beam 202A if it is using a beamforming based LBT mechanism. This is because existing mechanisms do not require WTRUs to receive transmissions on all beams prior to transmitting. Instead, the existing mechanisms operate under the assumption that, for example, WTRU1 204 may perform a transmission if it simply does not detect a transmission above a threshold from another WTRU such as WTRU2 202A. As such, in this example, TX beam 202A will be missed by WTRU1 204 since WTRU1 204 did not perform LBT in a correct direction or perform LBT using a necessary beam. Since WTRU1 204 performs reception using a narrow beam which is not oriented toward WTRU2 202, WTRU1 204 does not detect an on-going transmission from WTRU2 202 above the threshold. As a result, WTRU1 204 may initiate a transmission which would result in a collision occurring at the TRP 206.

Multiple LBT configurations may be provided and maintained in NR. In one embodiment, a different set of LBT parameters or type of LBT configuration may be utilized so as to avoid the problem addressed in FIG. 2. A WTRU may be configured with different types of LBT configurations or mechanisms by a gNB or other TRP. Each type of LBT mechanism may be defined by a set of parameters. From the perspective of a WTRU, an LBT type may be considered "stringent" LBT if it imposes stringent requirements to the WTRU before the WTRU is able to use the channel. An example of stringent LBT is an LBT type which has a large number of idle CCAs required and/or low energy threshold detection. An LBT type is referred to as "relaxed" if it imposes relaxed requirements on the WTRU before the WTRU is allowed to use the channel. An example of a relaxed LBT is an LBT type which has a small number of idle CCAs required or is configured with a high energy detection threshold.

Different types of LBT mechanisms may be configured. In some embodiments, a WTRU may be configured with a set of different types of LBT mechanisms. Each element in the set may be referred to as an LBT type or LBT configuration. A WTRU may be configured with different parameters for each possible LBT configuration or may be configured with parameters for one or more of a plurality of LBT configurations. In one embodiment, a WTRU may receive an LBT configuration via RRC signaling. Alternatively, a WTRU may receive such configuration using a MAC Control Element (CE). In an example, a WTRU may receive a MAC CE in a Random Access Response (RAR).

Configurable LBT parameters or sets thereof may be associated with an LBT configuration. These parameters may include at least one or more of the following: priority level; LBT type; maximum channel occupancy time (MCOT); occupied channel bandwidth (OCB); number of idle CCA; contention window size; contention window size adjustment; size, time duration or number of CCA slots, for example, $T_{sl}$; defer time, for example, td; energy threshold detection, for example, xthreshold; or contention window size. In an example, an expiration time value may represent the maximum time until the WTRU may perform a transmission for a given LBT process. Such time may include the time from which the LBT process is initiated. Such value may be configured in terms of absolute time, in slots, short TTIs or the like. An LBT process may be associated with one or more sets of parameters which may correspond to an LBT configuration. An LBT configuration may be identified using, for example, an LBT configuration identity (LBT_ID or LBT configuration ID). In some embodiments, one or more of an LBT_ID or LBT configuration ID may be conveyed explicitly. In some embodiments, one or more of an LBT_ID or LBT configuration ID may be conveyed implicitly. In some embodiments, a WTRU may be preconfigured with one or more of an LBT_ID or LBT configuration ID.

For example, a WTRU may be configured with priority level associated with each type of LBT or LBT configuration. For example, the WTRU may use the priority level or priority type to determine what LBT procedure and/or what LBT configuration to apply for a specific type of data and/or for data associated to a specific LCH or logical channel group (LCG) wherein, for example, data is itself associated with a corresponding priority level. For example, a WTRU may then use high priority type of LBT for ultra-reliable type of traffic. For enhanced mobile broadband (eMBB) traffic, the WTRU may use a lower priority type. MTC traffic may be configured to use an even lower priority type than eMBB.

An LBT type may indicate, for example, whether an LBT is considered stringent or relaxed. For example, a type of LBT may be configured with shorter MCOT for transmission in short duration to allow more WTRUs accessing the channel. For example, a type of LBT may be configured with OCB equal to 99% of the BW while another type of LBT may be configured with OCB equal to the channel BW of the transmitted signal. For example, an OCB may be equal to the RBs allocated for uplink transmission in a given frequency range, while in one or more other frequency ranges, the OCB may be equal to 99% of the BW. A number of idle clear channel assessment (CCA) slots may be counted to declare a channel acquired. The number of CCA slots may be denoted as a number N. In an example, a contention window size (CWS), denoted for example by a CW, an adjustment may be employed. For example, the method or criteria that may adapt a CWS, for example, based on a number of previously failed LBT procedures using an LBT configuration.

In another example, an LBT configuration may be associated with a cell, a BWP, for example, a center frequency location and/or an offset therefrom, a bandwidth, a TX or RX beam, a beamwidth or a plurality of parameters thereof. In such case, a WTRU may be configured with an LBT configuration for at least one of the following: component carrier (CC); BWP; a set of one or more PRBs in frequency and/or time for a given cell or carrier of a configuration of a WTRU; transmit or receive beam, or a group/set thereof, for example, the WTRU may be configured with LBT type that may be used in a set of transmit and/or receive beam; beamwidth used to access the channel, for example, the WTRU may be configured to associate a "stringent" LBT type with wide beams; an access class of the WTRU's configuration; a WTRU category and/or a WTRU capability; an LCH (or an LCG) and/or a mapping restriction thereto.

A WTRU may receive at least one configuration or association of a configuration for at least one LBT configuration via system information (SI), for example via minimum SI in a physical broadcast channel (PBCH). The at least one LBT configuration may be used by the WTRU to access the channel at least for initial access. Such an LBT configuration may also be used by the WTRU for fallback operation.

The LBT configurations may be tied to specific transmissions, transmission types, physical channels or signals. Physical channels may include control or data channels, shared channels, dedicated channels among others. Physical channels may be licensed or unlicensed channels. In an example, any of the following transmission types may be tied to a specific set of one or more LBT configurations: PUSCH transmission; PUCCH transmission; SRS transmission; or PRACH transmission. Similarly, an LBT configuration may be associated to a type of data transmission, message and/or procedure such as one of the following: SR transmission; uplink control information (UCI) transmission, random access transmissions; type of data and/or an L1/L2/L3 procedure.

The content of an UCI transmission may also be associated with a different LBT configuration set or configuration sets. For example, UCI for HARQ may have a first set of LBT configurations, and UCI for CSI reporting may have a second set of LBT configurations. Other UCI, for example, a scheduling request (SR) may have a different configuration than a sounding reference signal (SRS) transmission. In an embodiment, different configuration sets may be employed for different PUCCH formats, for example, format 1, 1a, 1b, 2, 2a, 3, 4, 5 or the like.

Random Access procedures and/or transmissions of specific message(s) may include a PRACH transmission and a message 3 (msg3) transmission. Furthermore, one or more RA triggers may be tied to a set of LBT configurations. For example, RA for beam recovery may have a first set of LBT configurations, whereas RA for a paging response may have a second set of LBT configurations. For example, this may include random access procedures configured with different priorities, for example, based on an association between the LBT configuration and one (or more) values or configuration parameters for a power ramping step and/or a scaling factor for backoff. For example, an LBT configuration may be associated with a set of PRACH resources, in particular when a set of resources is itself associated to a priority. For example, this may include a set of PRACH resources associated with a set of LCHs for SR purposes.

A type of data, radio bearer, logical channel or the like may correspond to, for example, data of different QoS requirements such as URLLC data, eMBB data, control plane signaling, etc. L1/L2/L3 procedures may correspond to: an L1, for example, a PRACH resource selection procedure; an L2, for example, a random access or scheduling request procedure; or an L3, for example, an RRC Connection Re-establishment procedure.

A WTRU may report LBT results to a gNB, TRP, another WTRU or the like. In some embodiments, a WTRU may be configured to perform LBT and report any results of the procedure to the gNB. This may help the gNB in dealing with the hidden node/exposed node problem. The reported result may be transmitted using the channel accessed after the configured LBT is performed. The reported results may include of the following: average energy detected within a preconfigured time; number of slots/symbols the WTRU waited to access the channel; a type of radio access technology detected for example WiFi/LAA. The gNB may schedule transmission resources for the reporting, for example, via DCI.

An LBT procedure may be selected in whole or in part by a WTRU. A WTRU configured with multiple LBT configurations in which each configuration is tied to a set of parameters may indicate or determine the appropriate LBT configuration to use for an UL transmission by the WTRU. The LBT configuration may be indicated by the network and the indication may be semi-static or dynamic. The indication may be achieved by at least one of: explicit indication from the gNB; timing; frequency; received BWP switching command from the network; transmit and/or receive beam(s) configuration from the network; beamwidth configuration provided by the network; RS ID; logical channel (LCH) of the transmission; or a waveform used for the UL transmission. Other parameters may also be used.

In an example of an explicit indication provided from a gNB, the network may indicate to the WTRU using higher layer signaling, one or more applicable LBT types to be used for one or more pre-configured times. For example, a WTRU may determine the LBT type to be used during initial access from RMSI. Alternatively, the network may use L1/L2 signaling or a combination of higher layer and L1/L2 signaling to indicate the applicable LBT type. For example, the WTRU may receive a DCI with an UL grant including a field indicating the appropriate LBT configuration.

With a timing indication, a slot, subframe and/or symbols over which a transmission is made may be tied to one or more specific LBT configurations. A frequency indication which may comprise RBs and/or a BWP over which an UL transmission is granted, may be tied to one or more specific configurations.

A BWP switch or switching command may be received from the network, for example, from a gNB or TRP. For example, a WTRU may be configured to determine the LBT type based on the BWP frequency allocation size and/or the location of the center frequency of the BWP.

One or more transmit and/or receive beam configurations may be received from the network. For example, an LBT type may be associated with a set of transmit and/or receive beam indices. For example, the transmit beam that have been identified as potential interferer with other nodes may have more stringent LBT type. The beam configuration may be a reciprocal or other type of beam configuration.

A beamwidth configuration may be received from the network. For example, a WTRU may use a relaxed LBT type for narrow beams given that the probability of collision occurring with other WTRUs is low, for example, the probability of multiple WTRUs using a same narrow beam is low.

In an embodiment, an UL grant may be tied to a CSI-RS ID or to an SRS-ID. The WTRU may determine the LBT configuration based on such IDs. In a method, the WTRU may have a configured mapping between CSI-RS configurations and SRS configurations. This may enable the WTRU to determine the appropriate Rx beam on which to perform LBT, which may be tied to the Tx beam on which to perform a transmission.

In an example, a LCH may be configured with one or more mapping restrictions, for example, each corresponding to a transmission requirement and/or with an LBT configuration. One or more of a broadcast control channel (BCCH), paging control channel (PCCH), common control channel (CCCH), dedicated control channel (DCCH) or dedicated traffic channel (DTCH) may each be configured with the same or different mapping restrictions. For example, a transmission may be configured with a requirement (for example latency, reliability, coding rate). The set of requirements may determine the required LBT configuration. A waveform used for the UL transmission may also be considered.

In some cases, a WTRU may have multiple LBT configurations applicable to one or more transmissions. For example, a WTRU may have an LBT configuration applicable to a specific slot and may further be indicated another LBT configuration in a DCI granting UL resources within that slot. In such a case, there may be a configured priority of LBT indications. For example, any LBT configuration indicated dynamically, for example within a DCI, may override a semi-static LBT configuration. This may be useful when new data becomes available for transmission with higher-priority and/or with more stringent transmission requirement(s) in terms of latency (e.g. URLLC traffic) than is supported by the semi-statically configured LBT parameters, which may require a more relaxed and/or stringent version of the LBT process to ensure latency and/or reliability requirements are satisfied.

In another embodiment, a WTRU may be provided with one or more sets of resources on which to perform an UL transmission. Each resource within the set may be associated to a different LBT configuration. For example, a WTRU may have two sets of semi-persistent scheduling (SPS) resources on which it may perform a transmission. Each SPS resource may be tied to a different beam-pair. As such, the WTRU may have a different LBT configuration associated to each SPS resource. In another example, a grant may provide two sets of resources on which to perform an UL transmission, with each set tied to a different LBT configuration. This may be useful when eMBB data is provided with a low-priority access class and URLLC is configured with high-priority access, each requiring different channel resources. The same may be true for lower priority traffic, for example, MTC traffic.

An LBT configuration may be selected by a WTRU, by a gNB or by a TRP. When a WTRU has multiple LBT configurations applicable to a transmission on one or multiple sets of resources, the WTRU may select an LBT configuration. The selection of LBT configuration may be determined by at least one of: a transmission resource; priority of the transmission; LBT type used by the gNB; an LBT used for a previous transmission in the same channel occupancy time (COT); an LBT used in a previous transmission; an LBT required for an upcoming transmission; a previously failed LBT attempt; an UL carrier type; a switch to a default BWP by a WTRU; an expiry of a timer; or a use of multiple LBT configurations. A transmission resource may be a resource, for example the symbols or subcarriers or BWP, on which a transmission is granted may be tied to an LBT configuration.

A priority of a transmission may refer to, for example, the LCH or LCH priority or logical channel group (LCG) priority of a transmission may be used by the WTRU to determine the appropriate LBT configuration. Priority may be determined by a ProSe Per-Packet Priority (PPPP) or a V2X type priority indicator. In another example, the priority of the procedure for which the UL transmission is for, for example, initial access, random access, UCI transmission, data transmission, SR, autonomous UL, or a paging response and may be used by the WTRU to determine the appropriate LBT configuration.

LBT types may be used by the gNB to send the control and/or data channel. For example, the gNB may send a preamble prior to sending information on a control and/or data channel. In such case, the WTRU may be configured with a table that maps a set of preambles to one or more LBT configurations. In other embodiments, a WTRU may be configured to determine the DL LBT used based on the CORESET and/or search space used to schedule the data.

Alternatively, the gNB may use or include a field on or in the DCI to indicate an LBT type used by the gNB. In other embodiments, a WTRU may be configured to determine the type of DL LBT based on the type of received data. Other implicit and explicit methods may also be applicable.

An LBT used for a previous transmission in the same channel occupancy time (COT) may be considered for a subsequent transmission. For example, a WTRU may use an LBT configuration based on the LBT configuration used by the gNB for a DL transmission performed previously within the same channel occupancy time. For example, if the gNB acquires a channel using an LBT configuration with a beam-pair, the WTRU may thus only reacquire the channel within the COT using an LBT configuration with the same beam-pair. In another example, a WTRU may have acquired a channel for a first transmission using a first LBT configuration. However, a second transmission, which may or may not be within the MCOT, may have different requirements and may thus not be covered by the first LBT configuration. In such a case, a WTRU may perform a second LBT using the second LBT configuration.

An LBT configuration used for a previous transmission of a LCH may provide an indication as to how to determine the LBT configuration to be used for an upcoming transmission of the same or a different LCH.

An LBT required for an upcoming transmission may also be considered as an indicator. For example, a WTRU may have data available for transmission or a transmission of another type, for example, PUCCH, PRACH, SRS, other UCI or the like and this may lead to two consecutive UL transmissions that may have different transmission requirements, for example, reliability, latency, QoS or the like. To ensure that both transmissions may fit in the same channel occupancy time, the WTRU may select an LBT configuration that satisfies the requirements of both upcoming transmissions.

Information regarding a previously failed LBT attempt may be considered in a future attempt. For example, a WTRU may attempt to acquire the channel with a first LBT configuration and may fail and may thus re-attempt to acquire a channel using a second LBT configuration. A WTRU may determine the order of selection of LBT configuration based on a parameter of the LBT configurations. For example, a WTRU may use a first LBT configuration based on the beam for which it is applicable, for example a best beam, then the WTRU may cycle to the next LBT procedure based on the second best beam and so on.

In an example, a regular UL carrier may be tied to a first LBT configuration and a supplementary UL carrier may be tied to a second LBT configuration. In such an example, the WTRU may determine the UL carrier type, for example, based on a measurement and may thus determine the associated LBT configuration.

A switch to a default BWP by a WTRU may be considered. For example, after a failed transmission on a first BWP, the WTRU may switch to another BWP such as a default BWP. Parameters of the LBT configuration used on the first BWP may or may not be applicable to the BWP.

An expiry of timer may indicate an LBT type. For example, the WTRU be configured to use "relaxed" LBT type after an expiry of pre-configured timer. The WTRU may use or may be configured with a dedicated timer for changing an LBT type or may be configured to use an existing timer for example an RLF timer or BFR timer.

In another embodiment, a WTRU may attempt to acquire the channel using multiple LBT configurations. This may enable the WTRU to transmit a same TB over multiple channels, in an embodiment, to achieve diversity. For example, a WTRU may receive a DCI enabling a transmission over a set of UL resources. Each UL resource within the set may be tied to different LBT configurations. The WTRU may initiate a first LBT using a first LBT configuration to transmit the data over a first set of UL resources. In one embodiment, depending on whether the first transmission was successful or not, the WTRU may initiate a second LBT using a second LBT configuration to transmit the data over a second set of UL resources.

A WTRU may be configured with multiple upcoming switching points, where a switching point is when a DL (or UL) slot or symbol is followed by a UL (or DL) slot or symbol. In one embodiment, a WTRU may be provided with or indicated with a pattern of UL/DL/undefined upcoming slots. Furthermore, the pattern configuration may indicate the LBT configuration the WTRU may use at one, some or every DL-to-UL switch. For example, the LBT configuration may be explicitly indicated for at least one DL-to-UL switch. In another example, the LBT configuration of a DL-to-UL switch may be implicitly determined by the WTRU. The WTRU may determine the LBT configuration based on at least one of: a duration of a gap provided for the DL-to-UL switch; a time since a previous DL-to-UL switch; time since a specific LBT configuration was used; beam pair link switch; the LBT configuration used for a previous UL-to-DL switch; the contents of a previous DL transmission; or a switch of a bandwidth part.

For example, if a previous DL-to-UL switch occurred less than x symbols prior to a current DL-to-UL switch, the WTRU may use a first LBT configuration. If the previous switch occurred more than x symbols prior to a current DL-to-UL switch, the WTRU may use a second LBT configuration. The first and second LBT configuration may include one different parameter, some different parameters or a complete set of different parameters.

The WTRU may determine a time since a specific LBT configuration was used. For example, a WTRU may perform a more stringent LBT, for example, a full LBT requiring multiple idle CCAs, for an UL transmission. A full LBT may be performed either before a first UL transmission or before an UL transmission after a DL-to-UL switch. If a certain amount of time has elapsed since the last stringent LBT, a WTRU may need to perform such an LBT configuration for a DL-to-UL switch.

The WTRU may receive a beam pair link (BPL) switch indication or instruction. For example, a first BPL may be used in a first UL transmission. The WTRU may be configured with an UL-to-DL switch and a subsequent DL-to-UL switch. If for a second UL transmission, the WTRU reuses the first BPL, the WTRU may use a first LBT configuration. If for the second UL transmission, the WTRU uses a second BPL, the WTRU may use a second LBT configuration. In another example, if the BPL used in an immediately preceding DL transmission is the same used for a subsequent UL transmission, a first LBT configuration may be used for the DL-to-UL switch. On the other hand, if the BPL used in an immediately preceding DL transmission is different from the BPL used in a subsequent UL transmission, a second LBT configuration may be used. The first and second LBT configuration may include one different parameter, some different parameters or a complete set of different parameters.

The WTRU may consult an LBT configuration used for a previous UL-to-DL switch. The WTRU may be indicated by the network the LBT configuration used for a previous DL transmission, for example, a DL transmission immediately preceding the DL-to-UL switch. The WTRU may determine an appropriate LBT configuration for the DL-to-UL switch based on an LBT configuration of the network.

The WTRU may consult the contents of a previous DL transmission to determine configuration information. The WTRU may determine the LBT configuration for a DL-to-UL switch based on the contents of the DL transmission immediately preceding the DL-to-UL switch.

The WTRU may be configured with a BWP switch or may be instructed to perform a BWP switch. For example, a first BWP may be used in a first UL transmission. The WTRU may be configured to perform an UL-to-DL switch and a subsequent DL-to-UL switch. If for the second UL transmission, the WTRU reuses the first BWP, it may use a first LBT configuration. If for the second UL transmission, the WTRU uses a second BWP, it may use a second LBT configuration. In another example, if the BWP used in an immediately preceding DL transmission is the same used for a subsequent UL transmission, a first LBT configuration may be used for the DL-to-UL switch. On the other hand, if the BWP used in an immediately preceding DL transmission is different from the BWP used in a subsequent UL transmission, a second LBT configuration may be used. The type of BWP switch may also affect the LBT configuration used. For example, the type of LBT performed by a WTRU may depend on at least one of: whether a new BWP reuses the same center frequency, whether the new BWP reuses the same bandwidth, whether the new BWP overlaps some or all of the previous BWP, the number of PRBs separating the old BWP and new BWP.

In an embodiment, a WTRU may be configured with multiple switching points within a COT. In such a case, the WTRU may expect to be indicated a starting, ending, or duration of a COT, for example, if the COT was acquired by the network. The WTRU may be configured with specific LBT configurations to be used at some or all DL-to-UL switching points in the COT. The indication of the LBT configuration for each switching point may be explicit, or may be implicit. Furthermore, the LBT configuration for a DL-to-UL switch may depend on a total number of switches in a COT, or the index of a UL-to-DL switch. For example, for a first switch, the WTRU may use a first LBT configuration. For a second switch, the WTRU may use a second LBT configuration and so on. An LBT configuration for a DL-to-UL switch may also depend on a position of one or more DL-to-UL switch within a COT.

A WTRU may determine the COT duration, or the position of a transmission within a COT, or the remaining time of a COT, based on an LBT configuration. In such a case, a new COT may be started based on the LBT configuration used at a switching point. For example, a WTRU may receive an indication that a new COT has begun at time x and may expect the COT to last at least until time x+MCOT, where MCOT is the maximum COT. In an embodiment, the indication may be received in a timer information element of RRC signaling. However, at some point within that time period, the WTRU may be configured with an LBT configuration via RRC or other signaling. If a successful channel acquisition is determined based on the new configuration, the WTRU may assume that the COT has restarted and thus the COT may last up to another MCOT duration.

LBT parameters within an LBT configuration may be adjusted by the network or by the WTRU. A WTRU may attempt to acquire a channel using a first LBT configuration. In the event that the WTRU fails to acquire the channel, the WTRU may modify or update some parameters of the LBT configuration. Such updated parameters may be used by the WTRU for a future attempt at channel access using the first LBT configuration. For example, a WTRU may be granted UL resources tied to a first LBT configuration. The WTRU may attempt to acquire the channel and may fail. The WTRU may retry to acquire the channel for the same granted resources by first modifying some parameters of the LBT configuration and re-attempting LBT. The updated or modified parameters may be applicable for a second or further attempt to acquire the channel for the same transmission, or may be applicable for a future attempt to acquire the channel for another transmission. The WTRU may revert back to an original configuration if a future attempt fails. If another failure occurs, the WTRU may modify parameters of the original configuration or the once (or subsequently) modified configuration. The WTRU may report to a gNB or other TRP the modified parameters.

In another example, a WTRU may receive an indication to update a parameter of an LBT configuration. The indication may be received via DCI, MAC CE or RRC (re)configuration. For example, a WTRU may receive a DCI indicating the number of CCA slots for an LBT configuration may be increased or decreased. The indication may be an inherent indication, for example, if a DCI indicates one or more parameters, the WTRU may implicitly determine that another parameter of an LBT configuration should be adjusted, modified or changed altogether.

Channels may be monitored, by a WTRU, for multiple concurrent LBT processes. In one embodiment, a WTRU may distinguish between CCA and LBT processes or triggers to initiate a transmission. In one embodiment, and without restriction to other embodiments herein, such as any LBT procedures described above, an LBT procedure may include two components that may be considered distinct from each other.

CCA may be performed by monitoring of a channel in terms of collecting a status of the channel assessment. A first component may include the monitoring of whether or not channel may be accessed including but not limited to the CCA, a related configuration and a state of the CCA. Monitoring and measuring may consider a recent state of the channel independently of the LBT procedure.

For example, the WTRU may monitor the energy present, for example, the WTRU may perform measurements on a channel independently of whether or not an LBT procedure is started and/or is ongoing. For example, the WTRU may continuously perform CCA during a given period during which it is not accessing the channel. The WTRU may store the historically observed energy values and/or measurements. The periodicity of these observations/stored values may be, but not be limited to, all observed values, and/or a value, for example a maximum, average and/or mean, value associated with a configurable time interval, for example, 1 us. A portion of the observed values which is less than all, yet more than one, may also be stored. In an embodiment, a WTRU may keep stored measurements using a window-based mechanism. These values may be stored continuously, or may be subject to a configurable expiry timer. Using a window mechanism, the WTRU may maintain a timer to determine how long to keep the stored measurements. In another embodiment, a WTRU may maintain a counter, for example, a COT counter, subframe counter or the like. A WTRU may store information of a recent channel state as measured quantities may be needed to perform CCA.

In one embodiment, the WTRU may monitor variations for at least one parameter associated, for example, parameters of an LBT configuration of the WTRU. For example, such parameter may include parameters used to determine the thresholds when performing a CCA assessment. More generally, such parameters may include at least one of the following: a maximum energy per MHz as a function of single carrier bandwidth (e.g., Tmax); a maximum energy detection threshold defined by regulatory requirements in dBm (e.g. XR); transmission type-dependent scaling parameters, for example, timing advance (TA) and power headroom (PH); a set of one or more maximum WTRU output powers measured in dBm for a carrier, for example, a transmit power (PTX). Other measured parameters may include a conducted power or power spectral density.

The WTRU may compare the received power to at least one threshold over a configurable time interval, for example, 1 us, providing the state of the channel over that time interval, for example, the state may be determined as either below the configured threshold value or above it. The WTRU may consider an equal value as either below or above. The comparison of the received power to the threshold may be determined a number of ways, for example, using a maximum value, average value over the interval, mean value.

The stored values may be considered in terms of threshold states or observed values and may be stored for a long duration, for example, for the purposes of channel statistics and channel selection. The stored values may be associated with, but not limited to, a number of possible LBT configurations and durations, for example, slot based, relaxed and/or stringent durations. These values/states may also be monitored in a sliding-window type manner, in an embodiment, to indicate the CCA for duration(s) in the recent past. These values/states may be stored and may be subject to a configurable expiry timer.

The WTRU may monitor the channel and perform CCA monitoring independently of whether or not the WTRU should access the channel to perform a transmission. Given a CCA status, a WTRU may determine when to transmit as a function of the applicable LBT configuration for the transmission.

A second component may dictate or indicate how to access the resources of the medium as a function of the applicable LBT configuration within the LBT process. Once LBT is triggered, a WTRU may determine an LBT configuration, derive thresholds/CCA quantities and then compare the thresholds or quantities with a recent state of the channel.

The WTRU may compare one or more configured LBT parameters applicable to a transmission, for example, a threshold value or CCA duration, with the current state of the CCA monitoring process when it initiates an access to the channel. The WTRU may consider the LBT process as being successful if the WTRU determines that the conditions for channel access are satisfied using the LBT parameters applicable to the transmission and/or the channel access. For example, for a CCA, the assessment may be determined based on parameters which relate to or may be applied to stored measurements for the channel for a period of time immediately preceding the start of the LBT procedure.

Otherwise if the WTRU determines that LBT is not successful, the WTRU may continue the CCA process using the stored state until all access requirements for the LBT configuration are met. The WTRU may consider any point in the window of stored CCA measurements as the starting point for the CCA evaluation associated with the LBT procedure, even if that point in time occurred prior to the start of the LBT procedure. In this way, the window may be a sliding window which is determined based on a timer, a number of symbols, slots or the like.

If a WTRU has a first ongoing LBT procedure and either the WTRU has data associated with different LBT configurations or the WTRU initiates a second LBT procedure using a different LBT configuration, the WTRU may use the configuration that enables the earliest determination that the WTRU may access the channel using the stored channel state measurements. The WTRU may also occupy the channel for the period determined using the LBT procedure which gives the longest COT.

If a transmission is configured under a given LBT configuration and the CCA monitoring process indicates the channel is available under a different LBT configuration, for example, a different priority level or different maximum occupancy time, the WTRU may choose to alter the transmission to satisfy the revised LBT requirements, and transmit either without performing LBT or may transmit with a revised LBT duration. The revised duration may be longer and preferably should not be shorter than the first determined COT.

An indication of a successful LBT may be sent without a prior request. In one embodiment, the WTRU may have prior knowledge of possible LBT configurations, and may determine if the current state of the CCA monitoring process satisfies such a configuration without a channel access request. Once the CCA process matches the configurations of an LBT process, the WTRU may be made aware of the availability of the channel, where it may access the additional channel without needing to perform an LBT process. An LAA process or procedure may be one implementation of such a mechanism. The additional availability of unlicensed spectrum may be used in an offloading scenario.

One CCA state may be shared by a plurality of LBT processes, each with a different configuration. For example, the WTRU may reset the state of a CCA monitoring process when at least one of the following events occurs: the WTRU determines that it may perform a transmission on the channel or the WTRU performs a transmission using resources of the channel. For example, the state may be reset if the outcome of at least one (and any) of the LBT processes is successful, if multiple LBT processes may operate concurrently. For example, whether or not the WTRU may (or would be required to) perform channel monitoring for CCA outside of the time for which the WTRU has at least one ongoing LBT procedure/process may be a configurable aspect of the WTRU, for example, by L3/RRC.

Methods for handling LBT procedures may or may not be applicable without restriction of a particular modelling of a described LBT procedure.

One or more methods may be employed by a WTRU or the network in order to handle a failure of an LBT procedure. In one embodiment, A WTRU may attempt to acquire a channel using a first LBT configuration and may fail to do so. Such failure may be determined when an amount of time has elapsed since the beginning of the LBT procedure. In another method, the WTRU may determine that the LBT has failed when it is unable to acquire the channel in a time required to enable transmission in the allotted slots or symbols. For example, if the WTRU has multiple LBT configurations applicable to a transmission and a first LBT configuration does not lead to channel acquisition but the second LBT configuration is successful, the WTRU may or may not consider an LBT failure event for the first LBT configuration. Determining a failure may be based on a time associated with a priority of a transmission or a priority of the data buffered for transmission.

For example, the LBT configuration may include a value corresponding to a maximum time until a transmission may be performed. The WTRU may start a timer when it initiates the LBT procedure, for example, independently of whether or not the WTRU starts a new CCA process. The WTRU may determine that the LBT is unsuccessful if the timer expires before the WTRU has performed a transmission since the start of the LBT procedure.

A WTRU may report to the gNB an indication of the failed LBT procedure. The indication may or may not be reported along with the LBT configuration for which the procedure failed. The reporting may be done on resources assigned to a WTRU for such reports. The WTRU may use resources tied to the LBT configuration that failed. The WTRU may report LBT failure only upon multiple failure events occurring. For example, the WTRU may report an LBT configuration failure only upon N failures occurring within a time window.

A set of multiple, for example one or more LBT failures for one or more LBT configurations, may trigger the WTRU to declare RLF or BFR. A set of multiple LBT failures for one or more LBT configurations on an SCG cell may trigger an SCG notification by the WTRU. A failed LBT procedure leading to a missed transmission may also lead to a HARQ transmission failure. The WTRU may thus reach a HARQ failure determination due to a series of LBT configuration failure determinations.

In an embodiment, a WTRU may perform multiple, for example simultaneous, LBT procedures, possibly using multiple LBT configurations. This may enable a reduction in channel acquisition latency. For example, a WTRU may have an UL transmission and may begin a first LBT procedure using a first LBT configuration. The WTRU may simultaneously begin a second LBT procedure using a second LBT configuration, for example before declaring success or failure of the first LBT procedure. This may be valid for a case where a WTRU may use any one of two beam-pair links for a transmission and may thus select the first one for which an LBT procedure is successful. In another example, when a WTRU may be assigned two sets of resources in different BWPs, the WTRU may perform the two LBT procedures (one per BWP) and may select any one BWP with successful LBT outcome on which to transmit.

Initiation of a 2nd LBT procedure, while a 1st one is ongoing may lead to a drop or interruption-based consideration. In an example, a WTRU may begin a first LBT procedure using a first LBT configuration for a first transmission. Before the first LBT procedure is completed, the WTRU may be indicated or may determine that a second transmission requiring a second LBT configuration is required. In some cases, the first LBT procedure may be valid for both transmissions and the WTRU may continue with the first LBT procedure and drop the second. In other cases, the first LBT procedure may not be valid for both transmissions, but the second LBT procedure may be valid for both transmissions and the WTRU may drop the first LBT procedure and continue with the second LBT procedure. In other cases, the WTRU may need to continue with both LBT procedures. The WTRU may be configured, by the network, to determine which procedure to drop on a case by case basis. The WTRU may be configured with a priority indication or table which provides the determination of which procedure remains valid.

Initiation of a $2^{nd}$ LBT procedure while a $1^{st}$ one is ongoing may impact an ongoing status. In one method, the WTRU may determine that it should use the LBT configuration as a function of the configuration that best satisfies one or more transmission requirement(s), for example, latency, reliability, or signal to interference plus noise ratio (SINR) requirements of the data available for transmission and/or of the transmission that triggered the LBT process. For example, the WTRU may determine whether or not it may transmit on a channel based on the CCA state as a function of at least a channel access priority class of the data or signal for which the WTRU is attempting to access the channel. For example, the WTRU may use the LBT configuration associated with the highest priority class of the data available for transmission.

The WTRU may use the current CCA state, either as accumulated from the previously ongoing LBT process and/or from CCA monitoring unrelated to an ongoing LBT procedure, and may perform an assessment of whether or not the WTRU may transmit on the channel using the selected LBT configuration. If the WTRU determines that it may not yet perform a transmission on the channel, it may continue the LBT procedure therefrom.

A WTRU may perform multiple simultaneous LBT procedures using multiple LBT configurations using a two or more step approach. In a first step, the WTRU may attempt a simplified version of each LBT procedure. Upon successful simplified LBT procedure for at least one LBT configuration, the WTRU may attempt full LBT procedure for the at least one LBT configuration. For example, a WTRU may be configured with two LBT configurations, one per beam-pair. In the first step, the WTRU may attempt a simplified version of the LBT procedure on each of the beam-pairs. The WTRU may then determine a valid beam-pair and an associated LBT configuration on which to perform a full LBT procedure. The WTRU may then perform the full LBT procedure on the associated LBT configuration.

A WTRU may perform multiple concurrent LBT procedures using multiple LBT configurations. The WTRU may be able to tune different parameters of each LBT configuration and may thus completely overlap the multiple LBT processes. In the case that an LBT process leads to a successful channel acquisition, the WTRU may terminate all ongoing LBT procedures and proceed with transmission. In other embodiments, the WTRU may continue performing any LBT procedures which remain unaffected by the transmission.

In some cases, the WTRU may not be able to fully overlap LBT processes. For example, if two or more LBT configurations utilize different beams, the WTRU may only be able to perform directional LBT on a single beam in a CCA slot.

The WTRU may maintain multiple LBT processes and may switch between them. In a first example, the WTRU may cycle through all the LBT processes at every CCA slot. In such an example, the WTRU may perform CCA on a first slot for a first LBT process using a first LBT configuration, then on the next slot the WTRU may perform CCA for a second LBT process using a second LBT configuration and continue cycling through all the LBT processes. The WTRU may drop all LBT processes when one of the processes is deemed successful in acquiring a channel.

In an example, a WTRU may perform CCA on CCA slots for a first process until the channel is determined busy for a slot. At that point, the WTRU may cycle to the second LBT process and begin CCA using the second LBT configuration. Such cycling may enable a variable defer period for the LBT processes. If required, upon returning to a LBT process that was begun previously, the WTRU may maintain the updated clear CCA slots in the counter. In such a case, the WTRU may maintain multiple CCA counters, one per LBT process. Alternatively, one or more counters corresponding to multiple LBT processes may be used.

Figure 3:
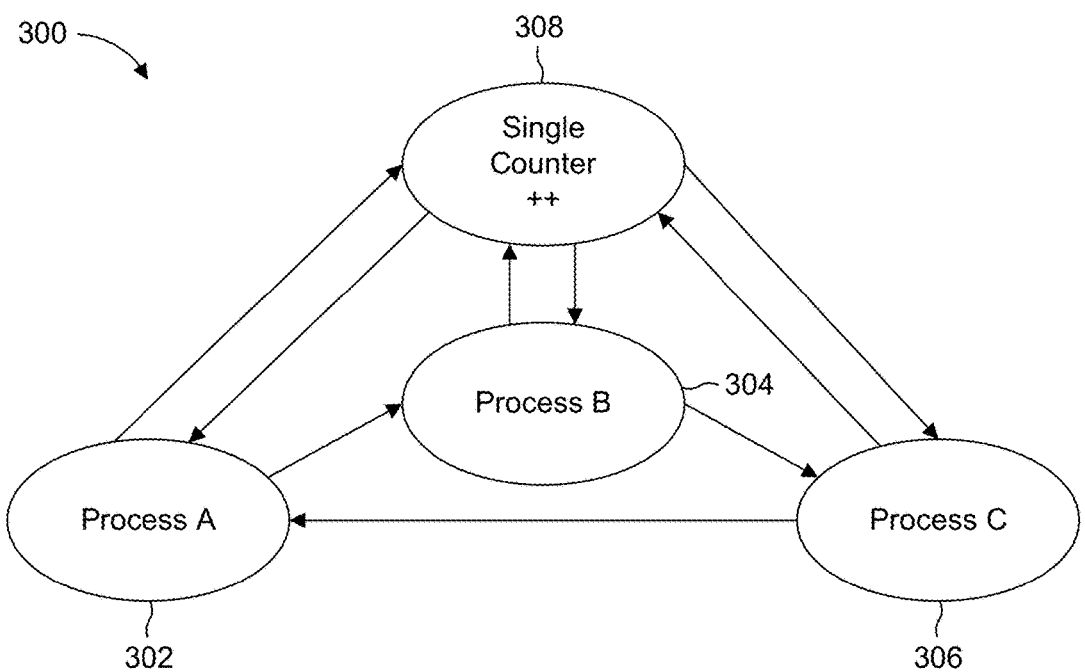
FIG. 3 is a state diagram illustrating a plurality of LBT processes each incrementing a single counter.

FIG. 3 is a state diagram 300 which illustrates a plurality of LBT processes 302-306 which all increment a single counter. In the example shown in FIG. 3, a WTRU may begin by employing process A 302 and may increment the single counter 308 until determining that a slot of process A 302 is busy. Upon detecting a busy slot, the WTRU may perform LBT on process B 304 and may continue to increment the single counter 308 until again detecting a busy slot. The WTRU may perform LBT on process C 306 and may again increment the single counter 308 accordingly for each slot which is determined to be available. Once a busy slot is detected during LBT process C 306, the WTRU may again perform LBT on another process, for example, process A 302. At any point, if the single counter 308 is determined to reach a threshold, the WTRU may assume that the LBT process is successful and may transmit accordingly.

Figure 4:
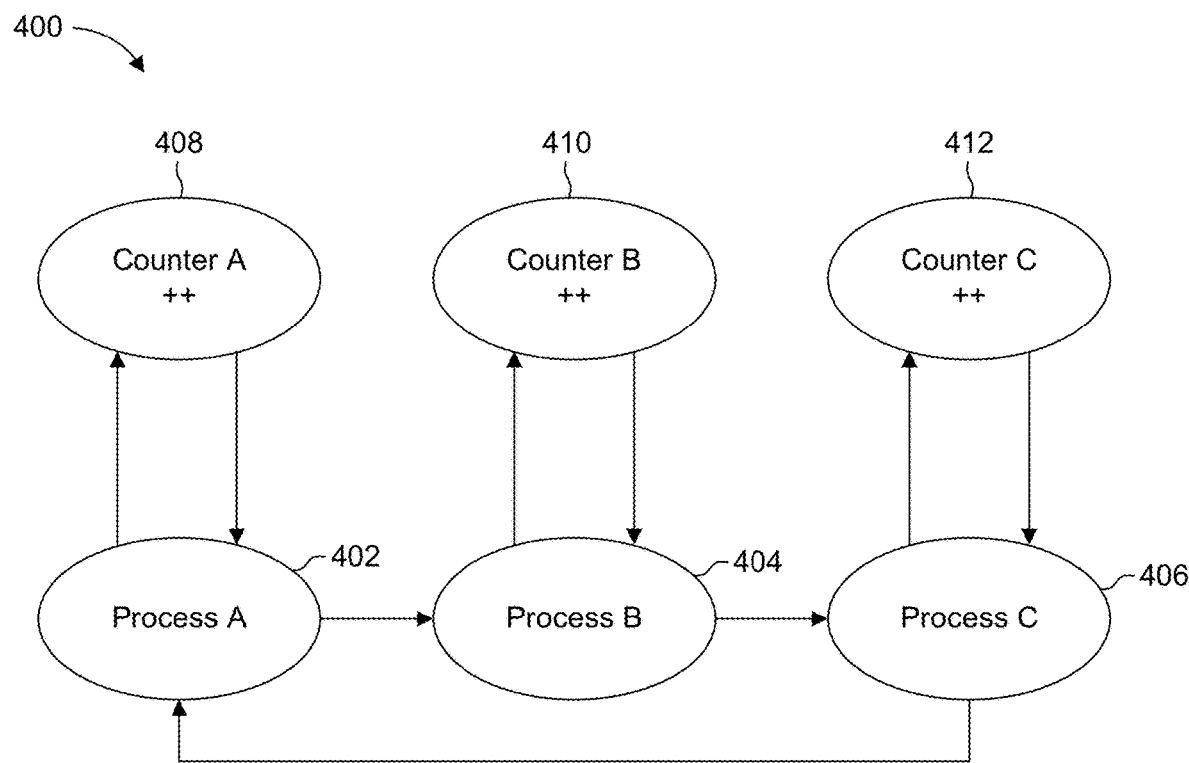
FIG. 4 is a state diagram illustrating a plurality of LBT processes each incrementing separate counters.

FIG. 4 is a state diagram 400 which illustrates a plurality of LBT processes 402-406 which each employ a counter 408-412. In the example shown in FIG. 4, a WTRU may begin LBT using process A 302 and increment counter A 408 until determining that a slot of process A 402 is busy. Upon detecting a busy slot, the WTRU may perform LBT on process B 404 and may increment counter B 410 until detecting another busy slot. The WTRU may perform LBT using process C 406 and increment counter C accordingly. Once a busy slot is detected during LBT process C, the WTRU may again perform LBT on another process, for example, process A 402. At any point, if a counter is determined to reach a threshold, the WTRU may assume that the LBT process is successful and may transmit accordingly.

In an embodiment, a WTRU may perform LBT for multiple LBT configurations using a common set or subset of parameters. For example, the WTRU may maintain a single CCA counter for all LBT configurations. The WTRU may perform CCA on a set of slots on a first LBT configuration. In the event of the channel being busy after M CCA slots, the WTRU may switch to a second LBT configuration. The WTRU may begin CCA on the slots with the counter starting at M. the WTRU may continue switching LBT configurations upon encountering a busy CCA event. The WTRU may declare a channel acquired when the over-all counter reaches N.

In such an embodiment, some LBT configurations may effectively be given an advantage given that they may have a reduced number of idle CCA slots required due to previous slots being determined for other LBT configurations. As such, the WTRU may change the order of LBT configurations for each one of one or more subsequent LBT events. The WTRU may determine an order of LBT configurations randomly or by another method. In an example, the WTRU may determine the order based on cycling the LBT configurations for every LBT event. That is, in a first LBT event or procedure, LBT configuration A may come first and LBT configuration B may follow configuration A. In a second LBT event or procedure, LBT configuration B may come first and LBT configuration A may follow LBT configuration B. The ordering of these procedures may change from procedure to procedure. In an example, the WTRU may determine the order based on the LBT configuration that acquired the channel in a last LBT event, for example, starting with the last LBT configuration and continuing to cycle through all configurations.

Figure 5A:
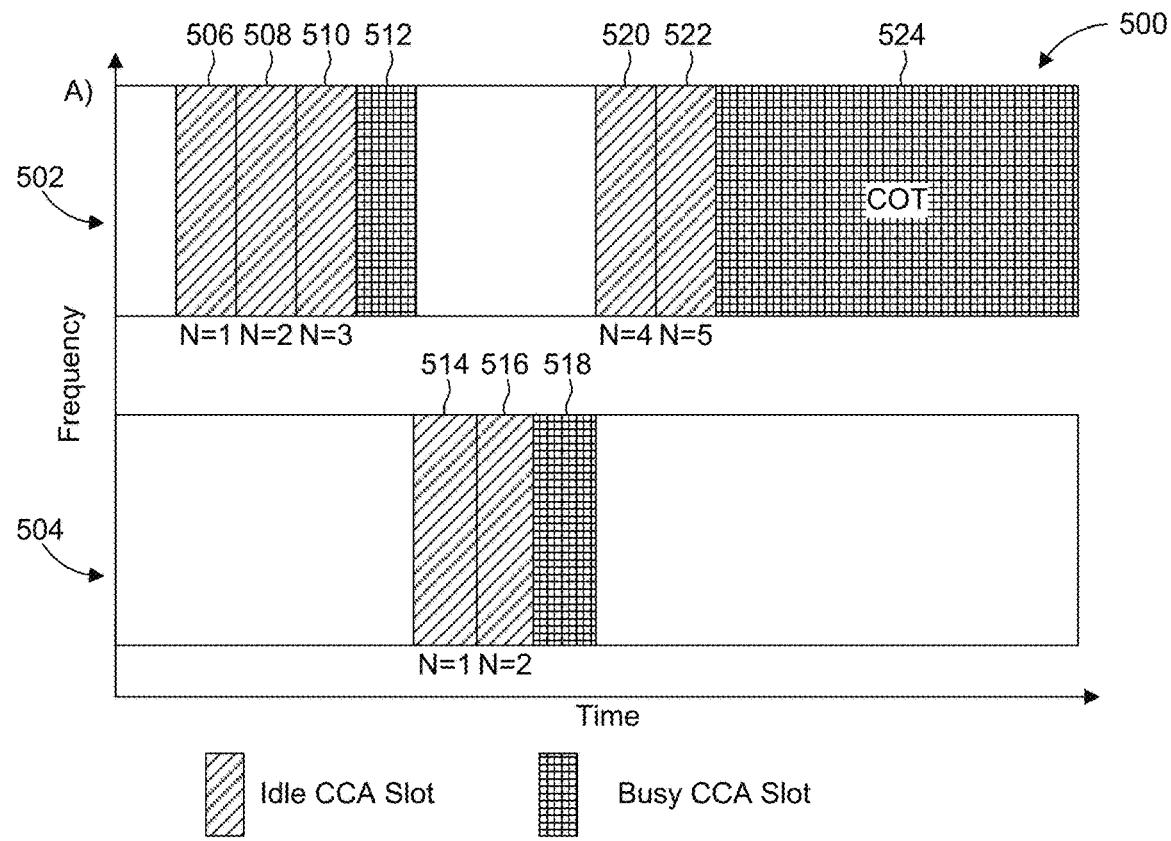
FIG. 5A is a slot based diagram timing diagram illustrating concurrent LBT processes using multiple counting loops.
Figure 5B:
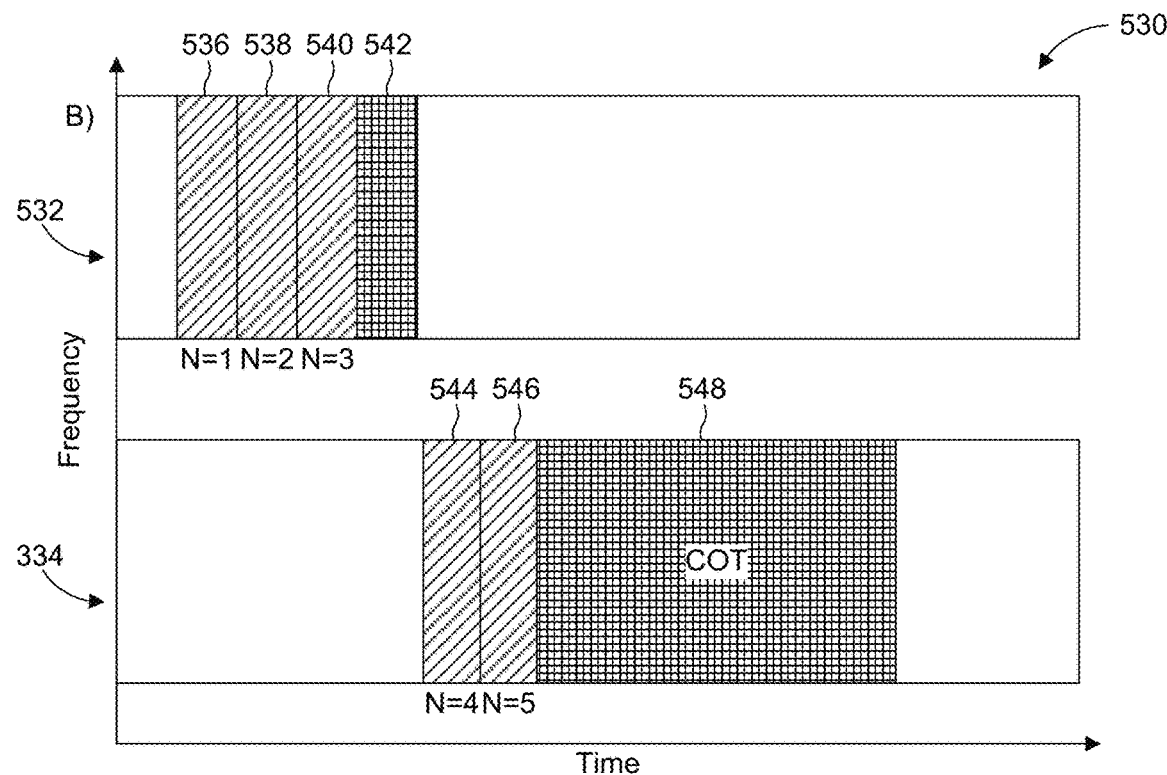
FIG. 5B is a slot based timing diagram illustrating concurrent LBT processes using a single counting loop.

FIGS. 5A and 5B show examples of channel acquisition methods performed by a WTRU, wherein multiple concurrent LBT procedures occur on two different BWPs of a carrier. In each FIG., BWPs are each shown separated in frequency.

FIG. 5A shows an example 500 where each LBT process, each with its own configuration indicating a different BWP 502, 504, may maintain independent CCA idle slot counters. A WTRU may attempt to determine whether a channel at a first slot 506 is busy, and may detect that the channel is idle. Because the channel is idle, the WTRU may set N=1. At a next slot 508, the WTRU may reattempt CCA, and come to the same conclusion. Thus, the WTRU may increment N to 2. Again, at a next slot 510, the WTRU may determine the channel is idle and may increment N once more to N=3. At the next slot 512, the WTRU may determine that the slot is busy and may not increment N.

Subsequently, the WTRU may switch to a second LBT process on a different BWP 504 upon encountering the busy CCA slot of the first LBT process of the first BWP 502. In such a case, the WTRU may maintain the counter for the first LBT process, in one embodiment, for a configurable amount of time. The WTRU may initiate a second counter, and may increment the second counter to N=1 at a first idle slot 514 in the different BWP 504. The WTRU may determine that a next slot 516 is also idle and may further increment the second counter to N=2. At a next slot 518, the WTRU may determine that the slot is busy and may not increment either counter.

Having detected another busy slot 518 on the different BWP 504, the WTRU may switch back to the first BWP 502 and may determine whether a next slot 520 is busy or idle. In this example, the WTRU has detected the next slot 520 as idle and subsequently increments N to 4. The WTRU repeats the CCA for the next slot 522 and again increments N to 5. Once N reaches 5, the WTRU determines to occupy the channel for a COT 524.

FIG. 5B shows an example 530 where two LBT processes, each with a configuration indicating a different BWP 532, 534, may maintain a single CCA idle slot counter. In such a case, the WTRU may switch to a second LBT process upon encountering a busy slot on a first LBT process. The WTRU may update the counter used for the first LBT process during the second LBT process. In FIG. 5B, the WTRU may attempt to determine whether a first slot 536 is idle and upon determining that the first slot 536 is idle, the WTRU may increment the single idle slot counter to N=1. The WTRU may determine that the next two slots 538, 540 are both idle and may increment N by one both times such that N=2 and then N=3. At the next slot 542, the WTRU may determine that the slot is busy, and subsequently may switch BWPs from BWP 532 to BWP 534. The WTRU may perform a CCA on the next slot 544 of the different BWP 534 and may determine that the slot 544 is idle. The WTRU may perform CCA again on the next slot 546 and may again determine that the slot 546 is idle. After having detected N=5 idle slots, the WTRU may determine a COT 548 for transmitting.

In some embodiments, the WTRU may be required to detect at least one instance of a signal or transmission having specific properties and having a received power or received quality above a threshold, before performing a transmission. Such signal is referred to as an "availability indication" in the following embodiments.

Such embodiments may address the problem of LBT failing to prevent a collision when beamforming is used. An availability signal may provide an indication as to a beam availability and may be transmitted from the TRP intended as a reception point for a transmission of a first WTRU. The TRP may be expected to transmit an availability indication only during periods of time when it is not receiving an on-going transmission from a second WTRU that would result in a collision. Even if the first WTRU does not detect an on-going transmission from the second WTRU, the first WTRU should not initiate a transmission without having received one or more availability indications from the TRP.

In some embodiments, the availability indication may include a signal similar to a synchronization signal or reference signal. Such signal may be generated from a sequence scrambled with at least one specific parameter. The at least one parameter may be configured by higher layers and may be associated with a beam indication or a transmission configuration indication (TCI) state. The WTRU may determine that the availability indication was received if the detected signal is received at a level higher than a threshold. Exemplary synchronization sequences may use gold sequences, pseudo noise sequences or the like.

In some embodiments, the availability indication may include, may consist or may be comprised of a transmission carrying information bits that are encoded and modulated over a physical channel. A cyclic redundancy check (CRC) may be included. The WTRU may determine that the availability indication was received if the decoding was successful. The information bits may include scheduling information, such as information identifying the WTRU or resources for the transmission.

An instance of the availability indication may preferably consist of one or a few OFDM symbols. The duration in terms of, for example, a number of OFDM symbols and frequency allocation may be fixed or may be configured by higher layers.

In some embodiments, the WTRU may attempt to receive an instance of the availability indication at one or more specific time occasions. For example, such time occasions may recur according to a certain period, such as every slot, as illustrated in FIGS. 5A and 5B. The set of occasions may be pre-defined, such as the first symbol of every slot, or may be configured by higher layers using, for example, parameters for the period and offset in terms of symbols and/or slots. Such configuration may be specific to a beam or TCI state. In this case, the WTRU may attempt reception of the availability indication for each configured beam using its specific configuration of the availability indication.

Figure 6:
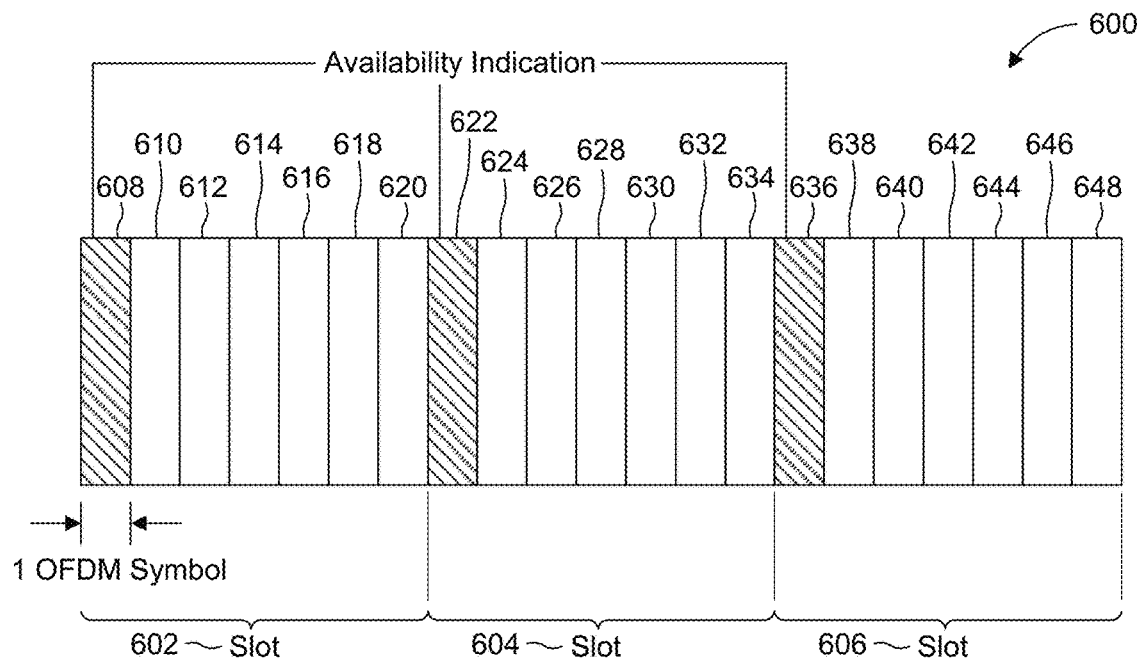
FIG. 6 is an illustration of an exemplary pattern for an availability indication.

FIG. 6 is an illustration 600 of a first slot 602 having 7 OFDM symbols 608-620; a second slot 604 having 7 OFDM symbols 622-634; and a third slot 606 having 7 OFDM symbols 636-648. In the first symbol 608 of the first slot 602, the WTRU may monitor for an availability indication. The WTRU may monitor the first symbol 622 of the second slot 604 and may also monitor the first symbol 636 of the third slot 606 for subsequent availability indications. In other symbols, for example, symbols 610-620, symbols 622-634 and symbols 638-648, the WTRU need not monitor for the availability signal and may conserve power. In some embodiments, there may be more or less symbols in a slot. In some embodiments, the availability indication may be provided in alternative symbols. In some embodiments, the availability indication may not be provided altogether. In an embodiment, an availability indication may occur in any one of the 7 symbols of a slot.

The WTRU may determine that the channel is available for transmission after receiving a certain number of availability indications. This number may be determined from a contention window in a manner similar to existing LBT embodiments or other embodiments, and may depend on a priority level associated with one or more transmissions, traffic types or the like. The WTRU may then initiate a transmission after a certain delay following reception of the last received availability indication. Such delay may be fixed or configured by higher layers. Such delay may depend on a priority level associated with the transmission.

In some embodiments, the WTRU may perform a transmission only using a beam for which a beam correspondence has been established with the beam or TCI state used for reception of the availability indication. In other embodiments, the transmission may comprise the beam for which correspondence has been established and there may be other beams selected.

In some embodiments, the WTRU may determine that the channel is available for transmission only if it determined that the channel has been "not busy" for a certain number of time occasions. In such embodiments, the channel may be determined as "not busy" in a time occasion if at least one of the following conditions is met: an availability indication was received during the time occasion or a portion thereof; at least one other criterion used to determine that the channel is "not busy" as used in existing LBT embodiments is met over the time occasion or a portion thereof.

When evaluating the at least one other criterion, the WTRU may subtract the energy from the availability indication prior to making the determination. For example, if the at least one other criterion consists of or is comprised of determining if energy is detected above a threshold, the WTRU may only consider energy not received from the availability indication. Alternatively, the WTRU may only evaluate the at least one other criterion over time symbols of the time occasion over which the availability indication cannot be mapped.

An NR-gNB may perform a LBT procedure for transmission of periodic CSI-RS associated with one or more serving beam(s) for resources associated with an unlicensed NR cell. In such case, the NR-gNB may not transmit such CSI-RSs if the NR-gNB determines that the channel is occupied for the concerned beam. This may impair an ability of a WTRU to perform beam failure detection. The WTRU may not determine whether a failure to receive a CSI-RS associated with one of its beam may be caused by blockage of the concerned beam or due to a discontinuity, for example, discontinuous transmission (DTX) in the transmissions from the NR-gNB following LBT for the concerned beam.

If the WTRU determines that the CSI-RS associated with the maintained beam(s) were not transmitted due to the channel being occupied, the MAC entity may not increment the BFI counter and may further reset the BFD timer or increment the BFD timer by a single unit within its configured value range.

The WTRU may determine that the CSI-RSs associated with a certain beam were not transmitted based on: measuring the interference plus noise on the channel associated with the beam; measuring the interference plus noise as well as the CSI-RSs on the channel associated with the beam; a received indication from the gNB or a non-serving gNB.

The interference plus noise on the channel associated with the beam may be measured. If the noise level is above a certain threshold, the WTRU may determine that the associated CSI-RSs were not transmitted.

The interference plus noise as well as the CSI-RS on the channel associated with the beam may be measured. If the noise level is above a configured threshold and the CSI-RS quality metric is less another configured threshold, the WTRU may determine that the associated CSI-RSs were not transmitted. This example is illustrated in FIG. 7.

Figure 7:
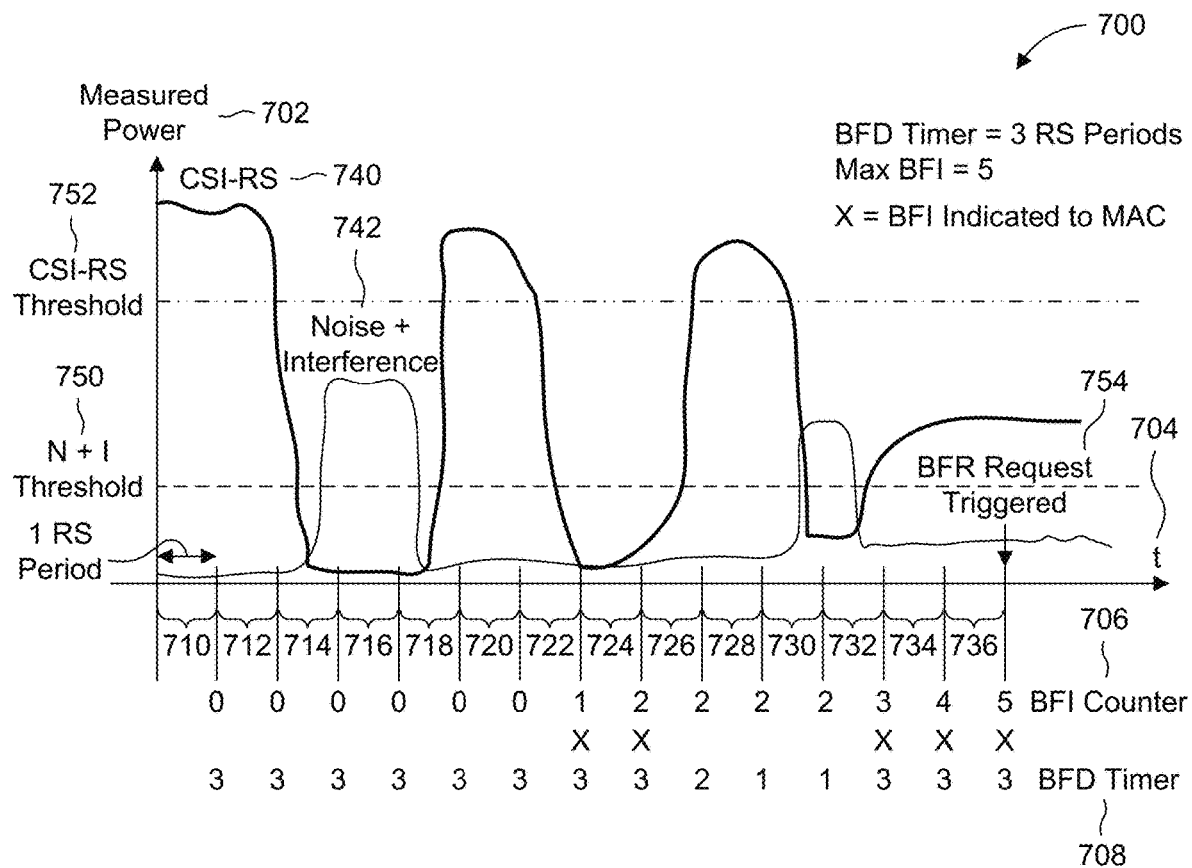
FIG. 7 is a graph illustrating an example realization of a beam failure detection procedure for a New Radio Unlicensed (NR-U) cell.

FIG. 7 is an illustration 700 of a method for incrementing a BFI counter 706. The illustration 700 includes a y-axis representing measured power 702 and an x-axis representing time (t) 704 in a series of RS periods 710-736. A WTRU may receive and measure CSI-RS power 740 in a first RS period 710. Because the CSI-RS 740 is above a CSI-RS threshold 752, the BFI counter 706 is not incremented at the end of RS period 710. The same may be true in a second RS period 712. In a third RS period 714, a power of CSI-RS 740 may be falling while the noise+interference 742 is rising. In this case, the WTRU may also not increment the BFI counter 706 at the end of RS period 714 since the WTRU may attribute the loss in power of the CSI-RS 740 in conjunction with the noise+interference 742 occurring in RS period 714 to the network not having acquired the channel to transmit CSI-RS 740. The WTRU may conclude the same in RS period 716 and may thus again not increment the BFI counter 706, In a next RS period 718, the CSI-RS power 740 may be rising while the noise+interference 742 may be falling. Again, the WTRU may not increment the BFI counter 706 at the end of RS period 718 given that the CSI-RS power 740 is above the threshold 752. In RS period 720, the power of the CSI-RS 740 may be high while the noise+interference 742 is low. No increment may be made to the BFI counter 706. In RS period 722, the CSI-RS 740 and noise+interference 742 may both be detected at low levels or not detected at all. In this case, the WTRU may increment the BFI counter 706 to 1 at the end of RS period 722. The BFD timer 708 may be activated. At a next RS period 724, the CSI-RS 740 and noise+interference 742 may again be detected at low levels and the BFI counter may again be incremented at the end of RS period 724. The BFD timer 708 may be restarted due to the BFI counter being incremented. In a next RS period 726, the WTRU may detect CSI-RS 740 above a threshold and thus may not increment the BFI counter 706. The WTRU may decrement the BFD timer 708, given that it is active and the BFI counter was not incremented. The same may be true in RS periods 728 and 730. In RS period 732, the CSI-RS 740 may rise, but may not rise above a threshold 752. Thus, the UE may assume the CSI-RS was not transmitted by the gNB and may not decrement the BFD Timer 708, even though it is active. Similar to RS period 724, the WTRU may increment BFI counter 706 in RS periods 732, 734 and 736 and may restart the BFI timer 708. The purpose of the BFI Timer 708 in this operation is to restart the BFI counter 706 if a sufficient amount of time has expired since a last beam failure event. Therefore, it is preferable to not restart the BFI counter 706 if the CSI-RS 740 was not transmitted due to the gNB not acquiring the channel. Instead the BFD Timer 708 may be paused when the WTRU assumes the CSI-RS 740 was not transmitted. Otherwise, poor channel availability would lead to the WTRU restarting the BFI counter 706 even though the WTRU has no indication that the beam is no longer failing.

An indication of whether or not a channel was acquired from a TRP may be provided from a serving gNB or a non-serving gNB to a WTRU. The WTRU may determine that the serving gNB was not able to occupy the channel if a certain reservation signal or resource was not transmitted by the serving gNB, and/or was transmitted by another neighboring gNB. Such a signal may be in a form of preamble, in an embodiment, encoded with the cell's physical ID or part of control signaling.

A CSI-RS associated with a certain beam may include an index. The index may be used by the WTRU to determine if it did indeed fail at detecting a previous SSB/dedicated reference signal (DRS) transmission or if it was never transmitted. The WTRU may thus retroactively modify its counter based on the reception of a CSI-RS at a future period.

In scenarios of high load conditions on the NR-U cell, sustained interference may lead to a prolonged duration where the BFI counter is not changed, for example, not incremented. Depending on the duration, the WTRU may lose synchronization and may also lose the established beam pair(s). To mitigate such a scenario, the WTRU may additionally maintain a "beam establishment timer," which resets each time the WTRU detects a CSI-RS transmission from a serving cell. Upon expiry of such timer, the WTRU may trigger a BFR request. The same treatment may be achieved using a "beam establishment counter" instead of a timer.

In addition to illustrating how a BFI counter may be incremented, FIG. 7 shows an example in which a beam failure detection procedure is modified for the case where an RS is not transmitted due to the channel being busy. For example, in RS period 714 the WTRU may determine that even though it may not detect the CSI-RS 740, it may detect high amounts of interference 742 and may thus assume the CSI-RS 740 was not transmitted in this RS period 714. Therefore, the WTRU may not increment its BFI counter 706 and may not trigger the BFD timer 708. On the other hand, when the timer has already been triggered, but a WTRU determines that the CSI-RS 740 might not have been transmitted due to high interference as in the $11^{th}$ RS occasion, RS period 730, in FIG. 7, the WTRU may neither decrement the BFD timer 708 nor increment the BFI counter 706.

Beams may be managed and detected for one or more aperiodic DRS transmissions. A WTRU may not be configured to expect periodic DRS/CSI-RS transmission. For example, the WTRU may be configured to receive an aperiodic DRS, for example if the unlicensed channel is experiencing a high occupancy rate. Providing periodic CSI-RS in high channel occupancy conditions may be challenging since such RS may be subject to LBT, especially if the gNB needs to transmit CSI-RS for multiple beams for different WTRUs. Given the nominal bandwidth occupancy requirement, a DRS transmission may occupy the nominal bandwidth regardless of the required number of RS resources.

The WTRU may be configured to measure DRS or CSI-RS in an aperiodic manner. The WTRU may be notified by the gNB to measure and report the measured DRS or CSI-RS. Upon reception of a DRS indication from the gNB, the WTRU may measure the corresponding RS, possibly within the same MCOT. The WTRU may further report the CSI-RS measurement, within the same MCOT, or at a later time using a periodic reporting on the PUSCH.

When the WTRU is not configured to monitor and measure CSI-RS periodically, the WTRU may perform an adjusted beam failure detection procedure. The WTRU may reset the BFI counter upon expiry of the BFD timer. The WTRU considers the unit of the BFD timer to be taken in absolute time or/and in the number of aperiodic CSI-RS occurrences. Alternatively, the WTRU may solely rely on reporting the measured CSI-RS to the gNB without sending any BFR requests.

The WTRU may be configured with an ability to request the transmission of a DRS transmission by a gNB. Such request may be conditioned on a HARQ operation point or a number of determined NACKs, for example. The WTRU may transmit such request using an autonomous uplink transmission (AUL) transmission using a scheduled transmission on the PUSCH on the PCell or the SCell or using a PUCCH transmission. The PRCU may provide additional information, such as a beam identity or a plurality of beam selections. The WTRU may further anticipate the corresponding DRS or CSI-RS transmission right after providing the indication. For example, if the uplink transmission used for such indication allows for an uplink to downlink transmission within the MCOT using a short LBT in-between, for example, the WTRU may anticipate the corresponding CSI-RS transmission right after providing the indication. Alternatively, a delay may be configured.

Beam failure recovery may be reported for an unlicensed NR cell. The WTRU may or may not be permitted to perform a RA procedure on an NR unlicensed cell, depending on the NR-U deployment. In NR-U deployments where the NR gNB is an SCell in unlicensed spectrum and the PCell is on the licensed spectrum, the WTRU may not be permitted to initiate RACH or PUCCH on the NR-U Scell. In NR-U deployments where the NR-gNB is operating in unlicensed spectrum in a stand-alone deployment, the WTRU may be able to initiate an RA procedure on the NR-gNB to report a BFR request. The nature of a RA procedure on a standalone NR-U cell may differ from a regular RA procedure in licensed spectrum.

The WTRU may report the BFR request using the PUSCH when the deployment configuration does not allow initiating a RA procedure on the NR-U Scell for example.

The WTRU may use an AUL to report a BFR request. The WTRU may provide an indication of the implied downlink beam or one or more SSB(s) in part of the AUL PUSCH transmission, implicitly or explicitly. The implied downlink beam may be based on a property of the PUSCH transmission or the selected PUSCH resource/channel. For example, the network may configure the WTRU with a set of timing offsets associated with certain downlink beams. The implied downlink beam may also be inferred from the AUL transmission itself. Alternatively, a MAC CE may provide the best downlink beam or a selection of beams, possibly accompanied with associated measurements.

The WTRU may monitor the PDCCH on the control resource set configured for BFR using a BFR coreset after transmitting a BFR request on the PUSCH. Since the BFR response from the gNB may also be subject to performance of an LBT procedure, the WTRU may attempt to decode the PDCCH on the implied downlink beam after a short LBT duration within the MCOT.

The WTRU may determine that the BFR request was not received successfully upon not decoding a PDCCH by the expiry of the Beam-failure-recovery-request-window. If the WTRU is configured with more than one Beam-failure-recovery-request-window, for example, over multiple non-consecutive slots, the WTRU may determine that the BFR request was not received successfully upon the expiry of the last BFR request window.

The WTRU may report a BFR request by initiating a RA procedure on the NR-U cell on which BFR was detected, provided RA is configured on the NR-U cell. Such procedure may be a 4-step or a 2-step RA procedure. If a 2-step RA procedure is initiated for BFR, the WTRU may include the best downlink beam ID part of the msg1 transmission. The WTRU may also include a number of selected downlink beams, with associated measurements, provided that allocated size of data on msg1 in the 2-step RA procedure is sufficient.

Figure 8:
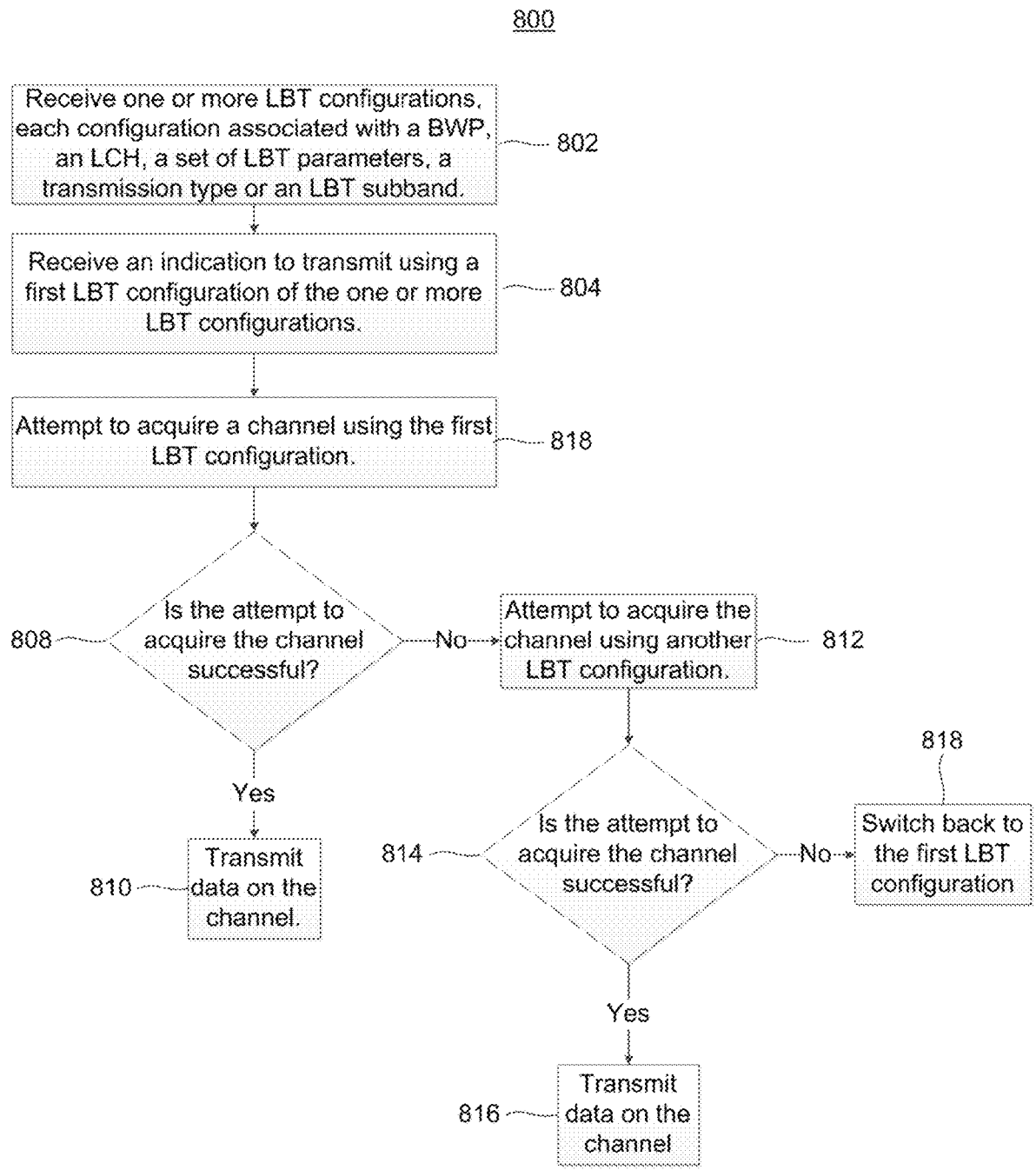
FIG. 8 is a flowchart which illustrates an exemplary method for switching between LBT configurations.

FIG. 8 is a flowchart 800 which illustrates an exemplary method for switching between LBT configurations. A WTRU may receive 802 LBT configurations associated with one or more of a beam, a BWP, an LCH, a set of LBT parameters, a transmission type or an LBT subband. The WTRU may receive 804, for example, via DCI, an indication to transmit using a first LBT configuration of the LBT configurations and may attempt 806 to acquire a channel using the first LBT configuration. If the attempt to acquire the channel is successful 808, the WTRU may transmit 810 data on the channel. If not, the WTRU may attempt 812 to acquire the channel using a second LBT configuration. If the second attempt is successful 814, the WTRU may transmit 816 data on the channel. If not, the WTRU may switch 818 back to the first LBT configuration. Alternatively, or in combination, the WTRU may attempt to acquire a channel using two LBT configurations simultaneously.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method performed by a wireless transmit/receive unit (WTRU) configured with an initial bandwidth part (BWP) and a second BWP, the method comprising:
   determining that the WTRU is unable to acquire a channel in the second BWP in time to enable transmission in a number of symbols, wherein an attempt to acquire the channel in the second BWP is based on a listen before talk (LBT) procedure in the second BWP;
   switching to operate in the initial BWP, based on a plurality of LBT procedures in the second BWP part;
   determining that the WTRU is unable to acquire a channel in the initial BWP, wherein an attempt to acquire the channel in in the initial BWP is based on an LBT procedure in the initial BWP; and
   triggering a radio link failure (RLF) based on a plurality of LBT procedures in the initial BWP.

2. The method of claim 1, further comprising:
   transmitting a notification that the initial BWP is unavailable.

3. The method of claim 2, wherein the notification is transmitted to at least one of a base station, transmission/reception point (TRP), or another WTRU.

4. The method of claim 1, wherein the initial BWP is associated with a first logical channel (LCH).

5. The method of claim 1, wherein the number of symbols is based on a contention window (CW) size.

6. The method of claim 1, wherein the triggering of the RLF further includes exceeding a threshold associated with a total elapsed time from the plurality of the LBT procedures.

7. The method of claim 1, wherein the second BWP is associated with a second logical channel (LCH).

8. A wireless transmit/receive unit (WTRU), configured with an initial bandwidth part (BWP) and a second BWP, the WTRU comprising:
   a transceiver; and a processor,
wherein the transceiver and the processor are configured to:
  operate in the second BWP;
  determine that the WTRU is unable to acquire a channel in the BWP in time to enable transmission in a number of symbols, wherein an attempt to acquire the channel in the second BWP is based on a LBT (listen before talk) procedure in the second BWP;
  switch to operate in the initial BWP, based on a plurality of LBT procedures in the second BWP part;
  determine that the WTRU is unable to acquire a channel in the initial BWP, wherein an attempt to acquire the channel in in the initial BWP is based on an LBT procedure in the initial BWP; and
  trigger a radio link failure (RLF) based on a plurality of LBT procedures in the initial BWP.

9. The WTRU of claim 8, further comprising:
  transmit a notification that the initial BWP is unavailable.

10. The WTRU of claim 9, wherein the transceiver is further configured to transmit the notification to at least one of a base station, a transmission/reception point (TRP), or another WTRU.

11. The WTRU of claim 8, wherein the initial BWP is associated with a first logical channel (LCH).

12. The WTRU of claim 8, wherein the number of symbols is based on a contention window (CW) size.

13. The WTRU of claim 8, wherein the triggering of the RLF further includes exceeding a threshold associated with a total elapsed time from the plurality of the LBT procedures.

14. The WTRU of claim 8, wherein the second BWP is associated with a second logical channel (LCH).

* * * * *

UNITED STATES PATENT AND TRADEMARK OFFICE
CERTIFICATE OF CORRECTION

PATENT NO.           : 12,289,758 B2
APPLICATION NO.  : 17/861770
DATED               : April 29, 2025
INVENTOR(S)        : J. Patrick Tooher et al.

It is certified that error appears in the above-identified patent and that said Letters Patent is hereby corrected as shown below:

In the Claims

In Column 36, Line 41, delete the word "part" after the word "BWP"

In Column 36, Line 44, delete the word "in" after the word "in"

In Column 37, Line 6, add the word "second" before the word "BWP"

In Column 37, Lines 8-9 replace the phrase "LBT (listen before talk)" with "listen before talk (LBT)"

In Column 37, Line 11, delete the word "part" after the word "BWP"

In Column 37, Line 14, delete the word "in" after the word "in"

In Column 38, Line 1, delete the phrase "The WTRU of claim 8, further comprising" and replace it with the phase "The WTRU of claim 8, wherein the transceiver is further configured to:"

Signed and Sealed this
First Day of July, 2025

Coke Morgan Stewart
*Acting Director of the United States Patent and Trademark Office*